US008928985B2

(12) United States Patent
Nakayama et al.

(10) Patent No.: US 8,928,985 B2
(45) Date of Patent: Jan. 6, 2015

(54) IMAGE BLUR CORRECTION DEVICE AND IMAGING APPARATUS

(71) Applicant: Sony Corporation, Tokyo (JP)

(72) Inventors: Tatsuyuki Nakayama, Kanagawa (JP); Takumi Fukuda, Tokyo (JP); Keishi Kobayashi, Kanagawa (JP); Kazuhiro Hattori, Tokyo (JP); Atsushi Horidan, Tokyo (JP)

(73) Assignee: Sony Corporation, Tokyo (JP)

( * ) Notice: Subject to any disclaimer, the term of this patent is extended or adjusted under 35 U.S.C. 154(b) by 136 days.

(21) Appl. No.: 13/681,524

(22) Filed: Nov. 20, 2012

(65) Prior Publication Data

US 2013/0176629 A1    Jul. 11, 2013

(30) Foreign Application Priority Data

Jan. 5, 2012    (JP) ................................ 2012-000758

(51) Int. Cl.
| G02B 27/14 | (2006.01) |
| G02B 15/14 | (2006.01) |
| G02B 27/64 | (2006.01) |
| H04N 5/232 | (2006.01) |

(52) U.S. Cl.
CPC ............. G02B 15/14 (2013.01); G02B 27/646 (2013.01); H04N 5/23258 (2013.01); H04N 5/2328 (2013.01)
USPC ......................................... 359/637; 359/559

(58) Field of Classification Search
CPC .. G02B 15/14; G02B 27/646; H04N 5/23258; H04N 5/2328
USPC .................................... 359/637, 559; 348/208
See application file for complete search history.

(56) References Cited

U.S. PATENT DOCUMENTS

| 4,013,339 A | * | 3/1977 | Ando et al. .................... 359/556 |
| 4,413,895 A | * | 11/1983 | Lee ................................ 396/464 |
| 4,780,739 A | * | 10/1988 | Kawakami et al. ............. 396/54 |

FOREIGN PATENT DOCUMENTS

JP    07-274056 A    10/1995

* cited by examiner

*Primary Examiner* — Scott J Sugarman
*Assistant Examiner* — Vipin Patel
(74) *Attorney, Agent, or Firm* — Rader, Fishman & Grauer PLLC

(57) ABSTRACT

An image blur correction device includes a lens unit having at least one lens and rotationally moving in a first direction which is a rotation direction of a first fulcrum axis and in a second direction which is a rotation direction of a second fulcrum axis relative to an outer casing, a first driving motor which causes the lens unit to pivot in the first direction, and a second driving motor which causes the lens unit to pivot in the second direction. An auxiliary axis is disposed opposite to the first driving motor with interposing of the lens unit, the lens unit pivots in the first direction and in the second direction by the rotation of output axes of the first and second driving motors, and each output axis is rotatably supported by a pair of first bearings and each auxiliary axis is rotatably supported by a second bearing.

10 Claims, 20 Drawing Sheets

IMAGE BLUR CORRECTION DEVICE AND IMAGING APPARATUS

BACKGROUND

The present technology relates to an image blur correction device and an imaging apparatus. Specifically, the present technology relates to a technical field in which positional accuracy and concentricity of an output axis are improved by supporting the output axis of a driving motor by a pair of first bearings and supporting an auxiliary axis by a second bearing so as to facilitate improving the reliability of a blur correction operation.

In an imaging apparatus such as a video camera or a still camera, an image blur correction device in which a lens is moved in a direction orthogonal to the optical axis direction to perform image blur correction is provided in some cases.

In the image blur correction device provided in the imaging apparatus, a lens unit which has a lens pivots in a first direction which is a rotation direction of a first fulcrum axis orthogonal to the optical axis of the lens and in a second direction which is a rotation direction of a second fulcrum axis orthogonal to the optical axis and the first fulcrum axis in some cases (refer to Japanese Unexamined Patent Application Publication No. 7-274056).

The lens unit pivots around the first fulcrum axis as a fulcrum in the yawing direction and pivots around the second fulcrum axis as a fulcrum in the pitching direction to perform image blur correction.

In the image blur correction device disclosed in Japanese Unexamined Patent Application Publication No. 7-274056, two driving motors (flat motors) each of which has plural coil portions, a magnet and a yoke are used as a driving unit to cause the lens unit to pivot in the yawing direction and in the pitching direction. The plural coil portions are arranged in a rotation direction (circumferential direction) of a fulcrum axis and N-poles and S-poles of the magnet are alternately magnetized in the rotation direction (circumferential direction) of the fulcrum axis. The axis direction of the output axis of each driving motor respectively matches the first fulcrum axis and the second fulcrum axis.

In the driving motors, the coil portions are disposed to face the magnets to cause the lens unit to pivot in the yawing direction and in the pitching direction with the rotation of the output axes by using thrust generated in relation to the magnets when a current is supplied to the coil portions.

For example, one driving motor is configured to be disposed on an upper surface side of the lens unit toward a vertical direction and cause the lens unit to pivot in the yawing direction in accordance with a supply direction of a current when the current is supplied to the coil portions. For example, the other driving motor is configured to be disposed on a side surface side of the lens unit toward a horizontal direction and cause the lens unit to pivot in the pitching direction according to a supply direction of a current when the current is supplied to the coil portions.

SUMMARY

In the configuration in which the lens unit pivots by using the driving motor, since the lens unit pivots in the first direction and in the second direction by rotating each output axis of each driving motor, it is necessary to increase the positional accuracy of each output axis so that each axis direction of each output axis matches a direction which is orthogonal to the optical axis.

In addition, when an auxiliary axis is provided on a side opposite to the output axis with the lens unit being interposed therebetween in order to increase the positional accuracy of the output axis, it is necessary to facilitate improving concentricity so that the center of the output axis and the center of the auxiliary axis are matched.

Then, it is desirable that the image blur correction device and the imaging apparatus according to an embodiment of the present technology improve the positional accuracy of an output axis and concentricity of an output axis and an auxiliary axis so as to facilitate improving the reliability of a blur correction operation.

According to an embodiment of the present technology, there is provided an image blur correction device including a lens unit which has at least one lens and can pivot in a first direction which is a rotation direction of a first fulcrum axis orthogonal to an optical axis of the lens and in a second direction which is a rotation direction of a second fulcrum axis orthogonal to the optical axis and the first fulcrum axis with respect to an outer casing, a first driving motor which causes the lens unit to pivot in the first direction, and a second driving motor which causes the lens unit to pivot in the second direction, wherein an auxiliary axis is disposed on a side opposite to the first driving motor with the lens unit being interposed therebetween, the lens unit respectively pivots in the first direction and in the second direction by the rotation of an output axis of the first driving motor and an output axis of the second driving motor, and each output axis is respectively rotatably supported by a pair of first bearings separated in an axis direction and each auxiliary axis is respectively rotatably supported by a second bearing.

Accordingly, the axis direction of the output axis and the axis direction of the auxiliary axis match the first fulcrum axis or the second fulcrum axis orthogonal to the optical axis in the image blur correction device.

It is desirable that the image blur correction device further include an inner frame which is positioned outside of the lens unit and an outer frame which is positioned outside of the inner frame and the lens unit be supported by the inner frame to freely pivot around one of the first fulcrum axis and the second fulcrum axis as a fulcrum, and the lens unit be integral with the inner frame and supported by the outer frame to freely pivot around the other of the first fulcrum axis and the second fulcrum axis as a fulcrum.

The lens unit is supported by the inner frame to freely pivot around one of the first fulcrum axis and the second fulcrum axis as a fulcrum, and the lens unit is integral with the inner frame and supported by the outer frame to freely pivot around the other of the first fulcrum axis and the second fulcrum axis as a fulcrum so that the lens unit pivots in the first direction and in the second direction with a simple configuration.

In the image blur correction device, it is desirable that a first member having a first surface portion and a second surface portion of which respective one end portions are connected in an orthogonal state and a second member having a first planar portion and a second planar portion of which the respective one end portions are connected in an orthogonal state be provided in the outer frame, and in a state in which the first surface portion and the first planar portion face each other and the second surface portion and the second planar portion face each other, the other end portion of the second surface portion and the other end portion of the first planar portion be joined and the other end portion of the first surface portion and the other end portion of the second planar portion be joined with a part of the first driving motor or the second driving motor being interposed therebetween.

The other end portion of the second surface portion and the other end portion of the first planar portion are joined and the other end portion of the first surface portion and the other end portion of the second planar portion are joined with a part of the first driving motor or the second driving motor being interposed therebetween so that it is possible to decrease the size of the first surface portion.

In the image blur correction device, it is desirable that the rigidity of the first member be different from the rigidity of the second member.

Since the rigidity of the first member is different from the rigidity of the second member, a member having low rigidity follows a member having high rigidity so that unnecessary deformation is not likely to occur in the outer frame.

In the image blur correction device, it is desirable that a disposition hole be formed in the inner frame, and the second bearing be disposed in the disposition hole.

A disposition hole is formed in the inner frame, and the second bearing is disposed in the disposition hole so that the size of the image blur correction device is not increased by disposing the second bearing.

In the image blur correction device, it is desirable that a disposition hole be formed in the outer frame, and the second bearing be disposed in the disposition hole.

The disposition hole is formed in the outer frame, and the second bearing is disposed in the disposition hole so that the size of the image blur correction device is not increased by disposing the second bearing.

In the image blur correction device, it is desirable that a mounting plate on which the magnet is mounted and a base portion to which a coil portion is mounted be provided in the driving motor, and the mounting plate be mounted to the lens unit.

The mounting plate on which the magnet is mounted and the base portion to which the coil portion is mounted are provided in the driving motor and the mounting plate is mounted to the lens unit so that the coil portion does not rotate at the time of rotational movement of the lens unit.

According to another embodiment of the present technology, there is provided an imaging apparatus including an image blur correction device which has a lens unit having at least one lens and an outer casing in which the lens unit is disposed and in which the lens unit pivots in a first direction which is a rotation direction of a first fulcrum axis orthogonal to an optical axis of the lens and in a second direction which is a rotation direction of a second fulcrum axis orthogonal to the optical axis and the first fulcrum axis with respect to the outer casing to correct a blur of an image, wherein the image blur correction device includes a first driving motor which causes the lens unit to pivot in the first direction, and a second driving motor which causes the lens unit to pivot in the second direction, and wherein an auxiliary axis is disposed on a side opposite to the first driving motor with the lens unit being interposed therebetween, the lens unit respectively pivots in the first direction and in the second direction by the rotation of an output axis of the first driving motor and an output axis of the second driving motor, and each output axis is respectively rotatably supported by a pair of first bearings separated in an axis direction and each auxiliary axis is respectively rotatably supported by a second bearing.

Therefore, the axis direction of the output axis and the axis direction of the auxiliary axis match the first fulcrum axis or the second fulcrum axis orthogonal to the optical axis in the imaging apparatus.

According to an embodiment of the present technology, the image blur correction device includes the lens unit which has at least one lens and can pivot in the first direction which is the rotation direction of the first fulcrum axis orthogonal to the optical axis of the lens and in the second direction which is the rotation direction of the second fulcrum axis orthogonal to the optical axis and the first fulcrum axis with respect to the outer casing, the first driving motor which causes the lens unit to pivot in the first direction, and the second driving motor which causes the lens unit to pivot in the second direction, wherein the auxiliary axis is disposed on the side opposite to the first driving motor with the lens unit being interposed therebetween, the lens unit respectively pivots in the first direction and in the second direction by the rotation of the output axis of the first driving motor and the output axis of the second driving motor, and each output axis is respectively rotatably supported by the pair of first bearings separated in the axis direction and each auxiliary axis is respectively rotatably supported by the second bearing.

Therefore, positional accuracy of the output axis and concentricity of the output axis and the auxiliary axis are increased to facilitate improving reliability of a blur correction operation.

According to the embodiment of the present technology, the image blur correction device further includes the inner frame which is positioned outside of the lens unit and the outer frame which is positioned outside of the inner frame, wherein the lens unit is supported by the inner frame to freely pivot around one of the first fulcrum axis and the second fulcrum axis as a fulcrum, and the lens unit is integral with the inner frame and supported by the outer frame to freely pivot around the other of the first fulcrum axis and the second fulcrum axis as a fulcrum.

Therefore, the lens unit can pivot in both of the first direction and the second direction with a simple configuration and so that it is possible to facilitate simplifying a configuration and a proper blur correction operation.

According to the embodiment of the present technology, in the image blur correction device, the first member having the first surface portion and the second surface portion of which respective one end portions are connected in an orthogonal state and the second member having the first planar portion and the second planar portion of which the respective one end portions are connected in an orthogonal state are provided in the outer frame, and in a state in which the first surface portion and the first planar portion face each other and the second surface portion and the second planar portion face each other, the other end portion of the second surface portion and the other end portion of the first planar portion are joined and the other end portion of the first surface portion and the other end portion of the second planar portion are joined with a part of the first driving motor or the second driving motor being interposed therebetween.

Therefore, the size of the first surface portion can be decreased and the outer shape of the image blur correction device is reduced so as to facilitate reducing the size of the image blur correction device.

According to the embodiment of the present technology, the rigidity of the first member is different from the rigidity of the second member.

Therefore, since a member having low rigidity follows a member having high rigidity so that unnecessary deformation is not likely to occur in the outer frame, it is possible to facilitate improving concentricity of the output axis and the auxiliary axis.

According to the embodiment of the present technology, the disposition hole is formed in the inner frame, and the second bearing is disposed in the disposition hole.

Therefore, the size of the image blur correction device is not increased by disposing the second bearing and it is possible to facilitate improving the positional accuracy of the output axes and concentricity of the output axes and the auxiliary axes and reducing the size of the image blur correction device.

According to the embodiment of the present technology, the disposition hole is formed in the outer frame, and the second bearing is disposed in the disposition hole.

Therefore, the size of the image blur correction device is not increased by disposing the second bearing and it is possible to facilitate improving the positional accuracy of the output axes and concentricity of the output axes and the auxiliary axes and reducing the size of the image blur correction device.

According to the embodiment of the present technology, the mounting plate on which the magnet is mounted and the base portion to which the coil portion is mounted are provided in the driving motor, and the mounting plate is mounted to the lens unit.

Therefore, a cable for energizing the coil portion can be disposed in a fixed manner to reduce a disposition space of the cable so that it is possible to facilitate reducing the size of the image blur correction device.

In addition, a member disposed inside can be smaller than a member disposed outside by mounting to the lens unit the magnet capable of reducing the outer shape with respect to the outer circumference of the coil portion so as to facilitate reducing the size of the image blur correction device.

According to another embodiment of the present technology, the imaging apparatus includes the image blur correction device which has the lens unit having at least one lens and the outer casing in which the lens unit is disposed and in which the lens unit pivots in the first direction which is the rotation direction of the first fulcrum axis orthogonal to the optical axis of the lens and in the second direction which is the rotation direction of the second fulcrum axis orthogonal to the optical axis and the first fulcrum axis with respect to the outer casing to correct a blur of an image, wherein the image blur correction device has the first driving motor which causes the lens unit to pivot in the first direction, and the second driving motor which causes the lens unit to pivot in the second direction, and wherein the auxiliary axis is disposed on the side opposite to the first driving motor with the lens unit being interposed therebetween, the lens unit respectively pivots in the first direction and in the second direction by the rotation of the output axis of the first driving motor and the output axis of the second driving motor, and each output axis is respectively rotatably supported by the pair of first bearings separated in an axis direction and each auxiliary axis is respectively rotatably supported by the second bearing.

Therefore, positional accuracy of the output axis and concentricity of the output axis and the auxiliary axis are increased so that it is possible to facilitate improving reliability of a blur correction operation.

DETAILED DESCRIPTION OF EMBODIMENTS

Embodiments of an image blur correction device and an imaging apparatus according to the present technology will be described below with reference to the attached drawings.

The embodiments shown below are applied to an image blur correction device in which the imaging apparatus of the present technology is applied to a video camera and the image blur correction device of the present technology is provided in the video camera.

Also, application ranges of an imaging apparatus and an image blur correction device of the present technology are not respectively limited to a video camera and an image blur correction device provided in a video camera. For example, the imaging apparatus and the image blur correction device of the present technology can be widely applied to imaging apparatuses embedded in various devices such as a still camera, a mobile phone, a PDA (Personal Digital Assistant) or the like and to image blur correction devices provided in these imaging apparatuses.

In the description below, the longitudinal direction, the vertical direction and the horizontal direction are represented in a direction seen from the photographer during photographing an image with the video camera. Accordingly, the subject side is the front side and the photographer side is the rear side.

Also, the longitudinal direction, the vertical direction and the horizontal direction mentioned below are set for convenience of explanation and there is no limitation to these directions with respect to the embodiments of present technology.

In addition, a lens mentioned below may be configured with a single lens and may be configured with plural lenses as a lens group.

Entire Configuration of Imaging Apparatus

Figure 1:
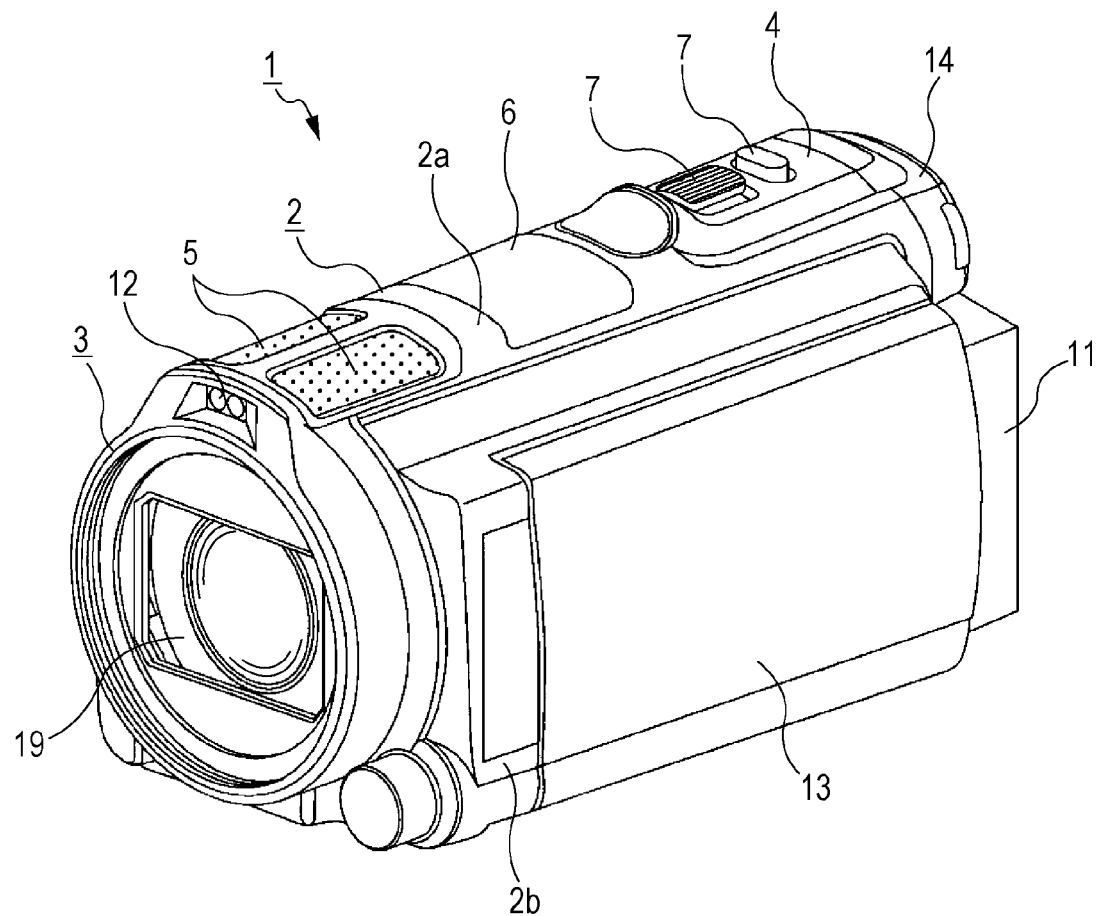
FIG. 1 illustrates an imaging apparatus according to an embodiment of present technology together with FIGS. 2 to 20 and is a perspective view of the imaging apparatus.
Figure 2:
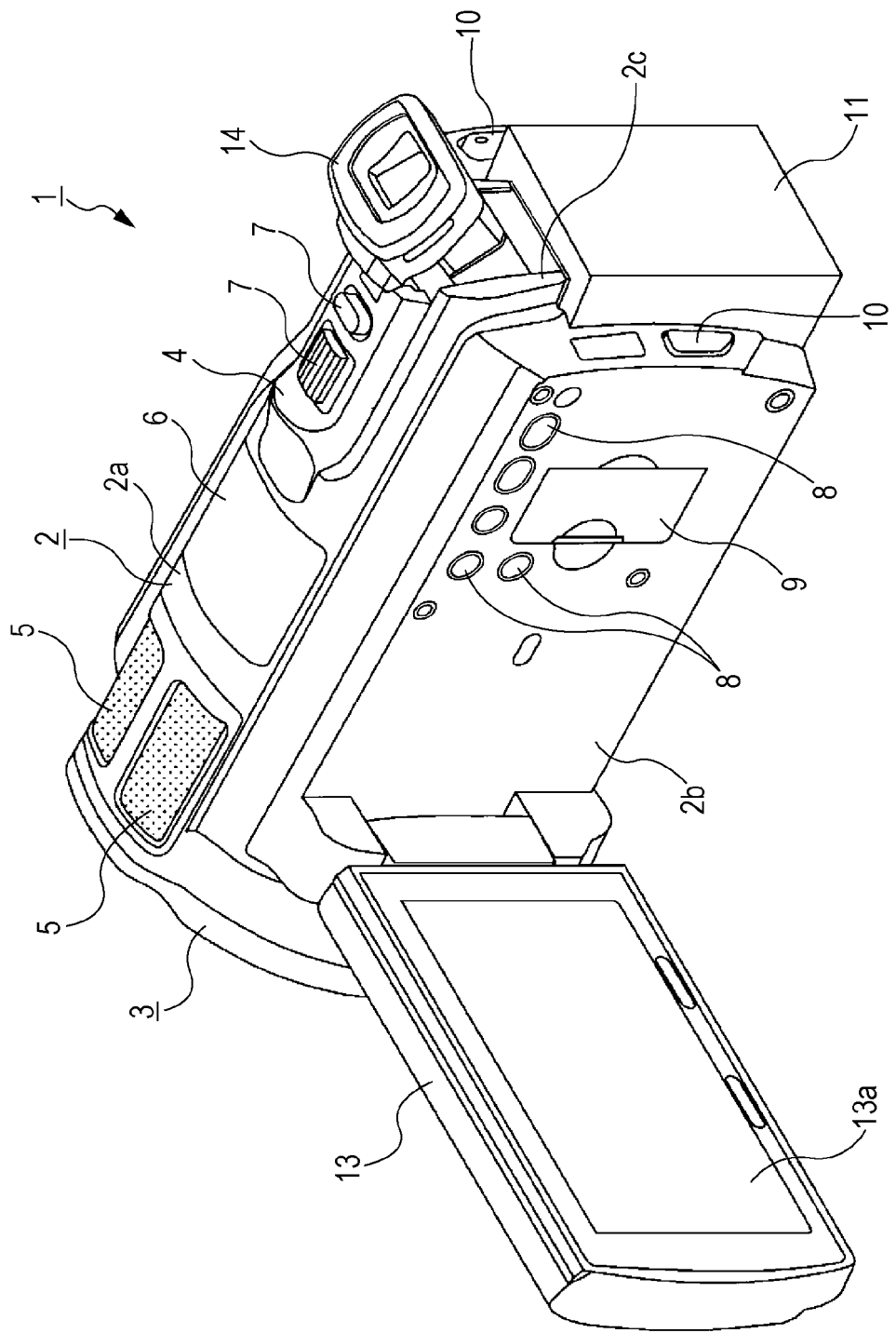
FIG. 2 is a perspective view of the imaging apparatus illustrated as seen from a different direction from FIG. 1.

An imaging apparatus 1 is provided with each necessary unit disposed inside and outside of an outer casing 2 (refer to FIGS. 1 and 2). For example, the outer casing 2 is formed in a long case shape in the longitudinal direction, a front end portion is provided as a front panel portion 3 and a rear end portion is provided as a housing case portion 4 of which an upper end portion is opened backward.

Microphones 5 and 5, an interface cover 6 and operation switches 7 and 7 are sequentially disposed on an upper surface 2a of the outer casing 2 from a front side. The operation switches 7 and 7 are, for example, a zoom lever and a photographing button.

Various operation buttons 8, 8, . . . such as a power button, an image reproduction button and the like are disposed on a one side surface 2b of the outer casing 2. A memory card 9 is mounted in the other side surface 2b of the outer casing 2.

Operation buttons 10 and 10 such as a mode switching button, a recording button and the like are disposed on a rear surface 2c of the outer casing 2.

A battery 11 is mounted on the rear surface of the outer casing 2 and a part of the battery 11 protrudes further backward than the rear surface 2c of the outer casing 2.

A flash 12 is disposed in an upper end portion of the front panel portion 3. The flash 12 is used during night photography and the like and auxiliary light is emitted forward from the flash 12.

A display unit 13 itself is connected to the side surface portion of the outer casing 2 to freely rotationally and rotatably move. A front end portion of the display unit 13 is connected to the outer casing 2 and has a display surface 13a.

A finder 14 is connected to the rear end portion of the imaging apparatus 1 so that the finder 14 is moved slidably in the longitudinal direction and rotationally in an inclined direction to the housing case portion 4.

The finder 14 is slidable between a housed position in which a portion other than the rear end portion is housed in the housing case portion 4 and a withdrawn position of being withdrawn from the housing case portion 4. Moreover, the finder 14 can pivot around the front end portion as a fulcrum at the withdrawn position in the inclined direction.

Configuration of Image Blur Correction Device

An image blur correction device 15 is disposed inside of the outer casing 2 (refer to FIGS. 3 to 8). The image blur correction device 15 has an outer frame 16, an inner frame 17, a holding frame 18 and a lens unit 19.

The outer frame 16 is configured by joining a first member 20 and a second member 21.

The first member 20 is formed with a first surface portion 22 facing the vertical direction and a second surface portion 23 facing the horizontal direction and a right end portion of the first surface portion 22 and an upper end portion of the second surface portion 23 are connected. An insertion hole 22a is formed in the portion of the first surface portion 22. The second surface portion 23 has a pair of pillar portions 24 and 24 which are disposed to the front and rear and extend substantially up and down and a connecting portion 25 which is connected to each lower end portion of the pillar portions 24 and 24 and extends to the front and rear. Upper end portions of the pillar portions 24 and 24 are provided as inclined portions 24a and 24a which are inclined so as to be displaced to the left as they proceed upward and upper end portions of the inclined portions 24a and 24a are respectively connected to both front and rear end portions of the right end portion of the first surface portion 22.

The second member 21 is formed with a first planar portion 26 facing the vertical direction and a second planar portion 27 facing the horizontal direction and a left end portion of the first planar portion 26 and a lower end portion of the second planar portion 27 are connected. In the center portion of the first planar portion 26, a disposition hole 26a is formed. In the center portion of the second planar portion 27, an insertion disposition hole 27a is formed. In both the front and rear end portions of an upper end portion of the second planar portion 27, inclined mounting portions 27b and 27b which are inclined so as to be displaced to the right as they proceed upward are provided.

A lower end portion of the second surface portion 23 of the first member 20 and a right end portion of the first planar portion 26 of the second member 21 are joined by screwing.

The second member 21 is thicker than the first member 20 and has high rigidity. For example, the second member 21 is made of die cast magnesium or the like and the first member 20 is made of a metal material such as iron.

Also, one of the first member 20 and the second member 21 may have a higher rigidity than the other and the first member 20 may have higher rigidity than the second member 21.

As described above, since one of the first member 20 and the second member 21 has a higher rigidity than the other, a member having low rigidity is slightly deformed following a member having high rigidity in a state in which both members are joined. For example, when the second member 21 has a higher rigidity than the first member 20, the first member 20 is slightly deformed following the second member 21.

The inner frame 17 is configured to be disposed inside of the outer frame 16 and join a first supporting member 28 and a second supporting member 29.

The first supporting member 28 is formed with a top surface portion 30 facing the vertical direction and a right surface portion 31 facing the horizontal direction and a right end portion of the top surface portion 30 and an upper end portion of the right surface portion 31 are connected. An insertion disposition hole 30a is formed in the center portion of the top surface portion 30. An insertion hole 31a is formed in the center portion of the right surface portion 31.

The second supporting member 29 is formed with a bottom surface portion 32 facing the vertical direction and a left surface portion 33 facing the horizontal direction and a left end portion of the bottom surface portion 32 and a lower end portion of the left surface portion 33 are connected. A mounting hole 32a is formed in the center portion of the bottom surface portion 32. A disposition hole 33a is formed in the center portion of the left surface portion 33.

A lower end portion of the right surface portion 31 of the first supporting member 28 and a right end portion of the bottom surface portion 32 of the second supporting member 29 are joined by screwing and a left end portion of the top surface portion 30 of the first supporting member 28 and an upper end portion of the left surface portion 33 of the second supporting member 29 are joined by screwing.

The second supporting member 29 is thicker than the first supporting member 28 and has high rigidity. For example, the second supporting member 29 is made of die cast magnesium or the like and the first supporting member 28 is made of a metal material such as iron.

Also, one of the first supporting member 28 and the second supporting member 29 may have higher rigidity than the other and the first supporting member 28 may have higher rigidity than the second supporting member 29.

As described above, since one of the first supporting member 28 and the second supporting member 29 has higher rigidity than the other, a member having low rigidity is slightly deformed following a member having high rigidity in a state in which both members are joined. For example, when the second supporting member 29 has higher rigidity than the first supporting member 28, the first supporting member 28 is slightly deformed following the second supporting member 29.

The holding frame 18 is configured to be disposed inside of the inner frame 17 and join a first mounting member 34 and a second mounting member 35.

The first mounting member 34 is formed with an upper surface portion 36 facing the vertical direction and a right side surface portion 37 facing the horizontal direction and a right end portion of the upper surface portion 36 and an upper end portion of the right side surface portion 37 are connected. An insertion disposition hole 37a is formed in the center portion of the right side surface portion 37.

The second mounting member 35 is formed with a lower surface portion 38 facing the vertical direction and a left side surface portion 39 facing the horizontal direction and a left end portion of the lower surface portion 38 and a lower end portion of the left side surface portion 39 are connected. A mounting hole 39a is formed in the center portion of the left side surface portion 39.

A lower end portion of the right side surface portion 37 of the first mounting member 34 and a right end portion of the lower surface portion 38 of the second mounting member 35 are joined by screwing and a left end portion of the upper surface portion 36 of the first mounting member 34 and an upper end portion of the left side surface portion 39 of the second mounting member 35 are joined by screwing.

The lens unit 19 is disposed inside of the holding frame 18 and has a lens barrel 40, plural lenses 41, 41 ... arranged to the front and rear inside of the lens barrel 40 and an imaging unit 42 mounted on a rear end portion of the lens barrel 40. The lens barrel 40 is formed in a long cylindrical shape to the front and rear. The imaging unit 42 has an imaging element (not shown) such as a CCD (Charge Coupled Device) or a CMOS (Complementary Metal-Oxide Semiconductor).

A cover member 43 is mounted on the outer circumferential side of a lens 41 positioned furthest toward the front side of a front surface of the lens barrel 40. The cover member 43 is formed in a circular shape and the front surface is formed in a spherical shape which protrudes forward.

Figure 4:
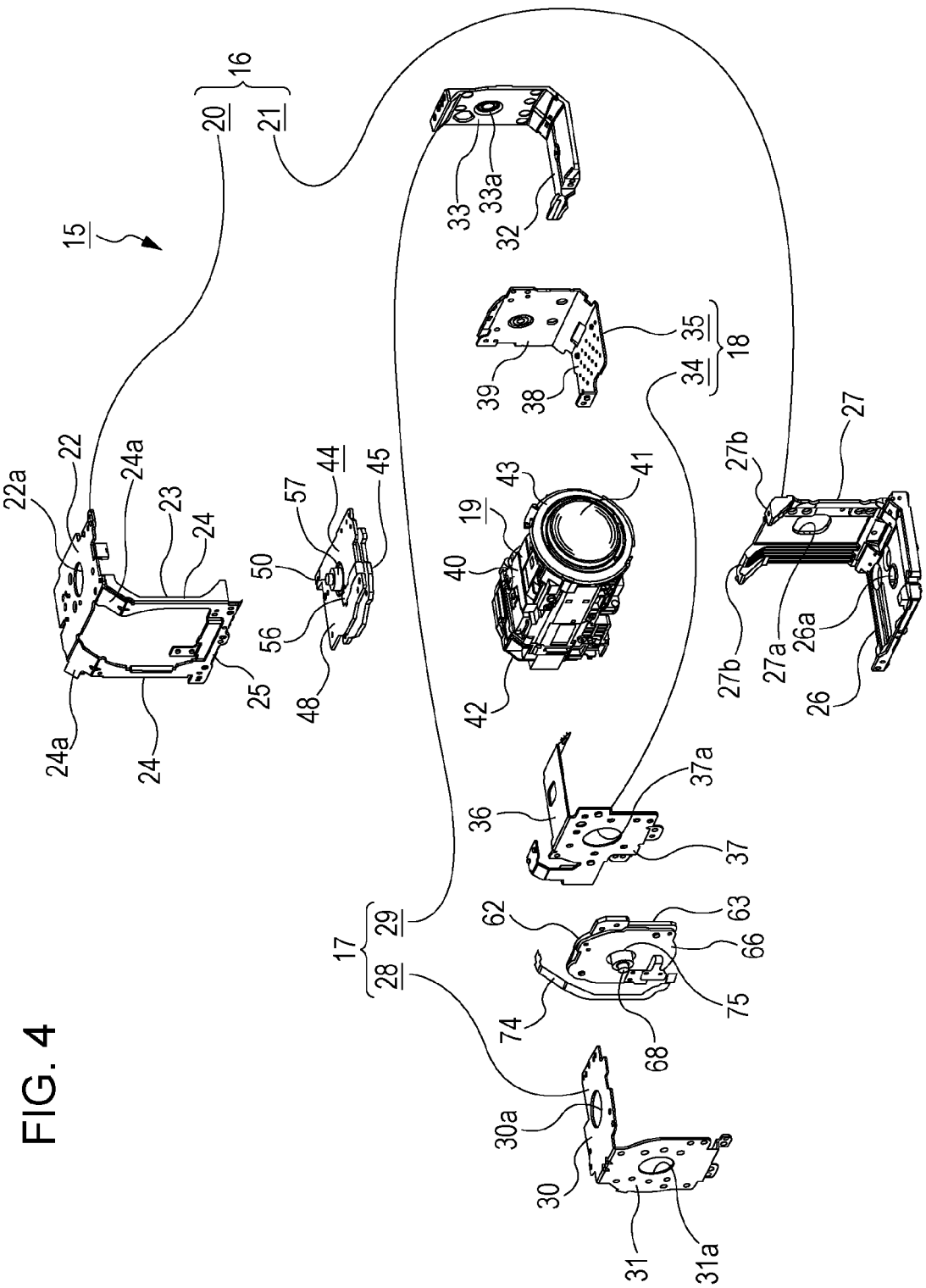
FIG. 4 is an exploded perspective view of the image blur correction device.
Figure 6:
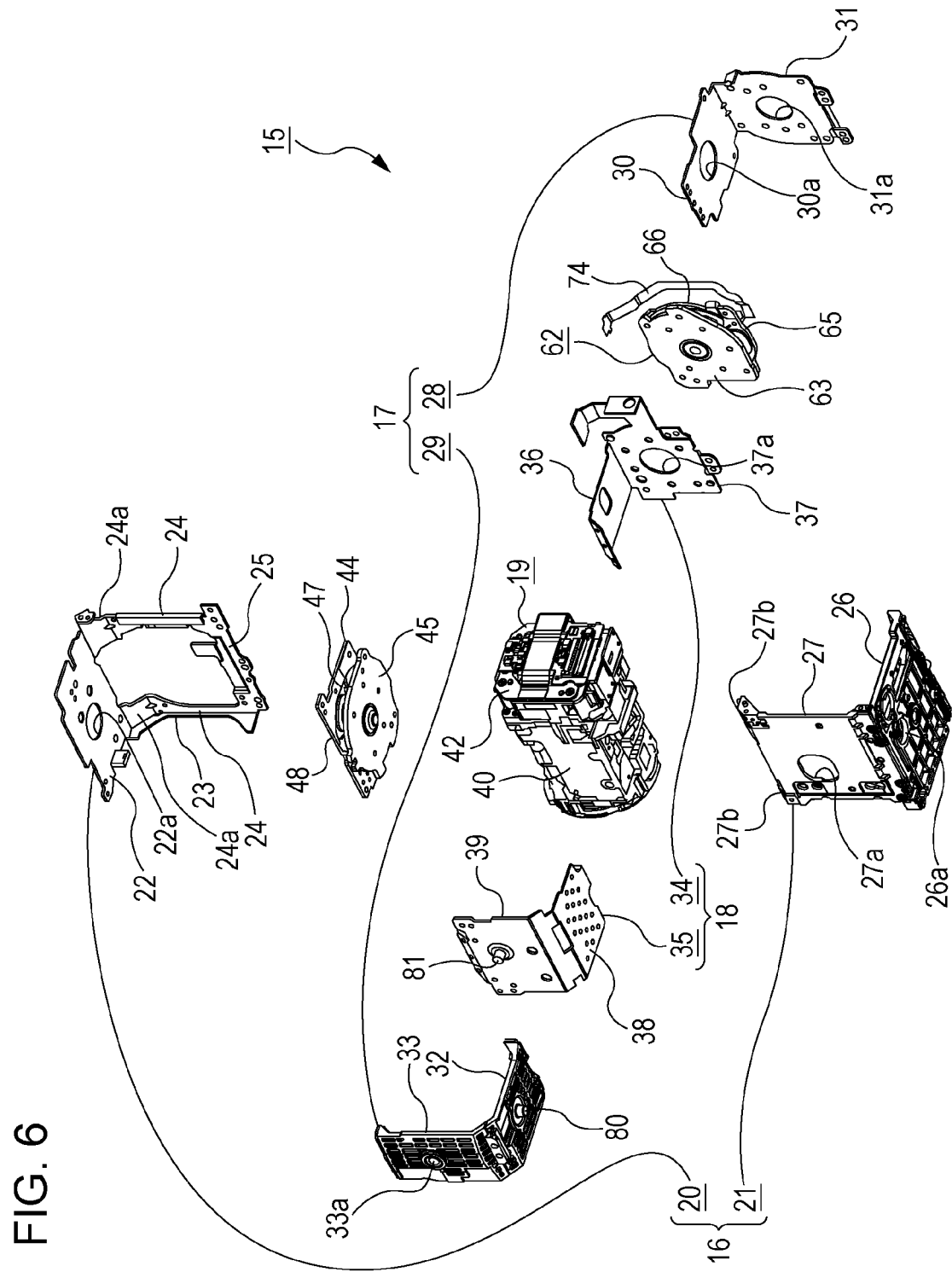
FIG. 6 is an exploded perspective view of the image blur correction device illustrated as seen from a different direction from FIG. 4.
Figure 7:
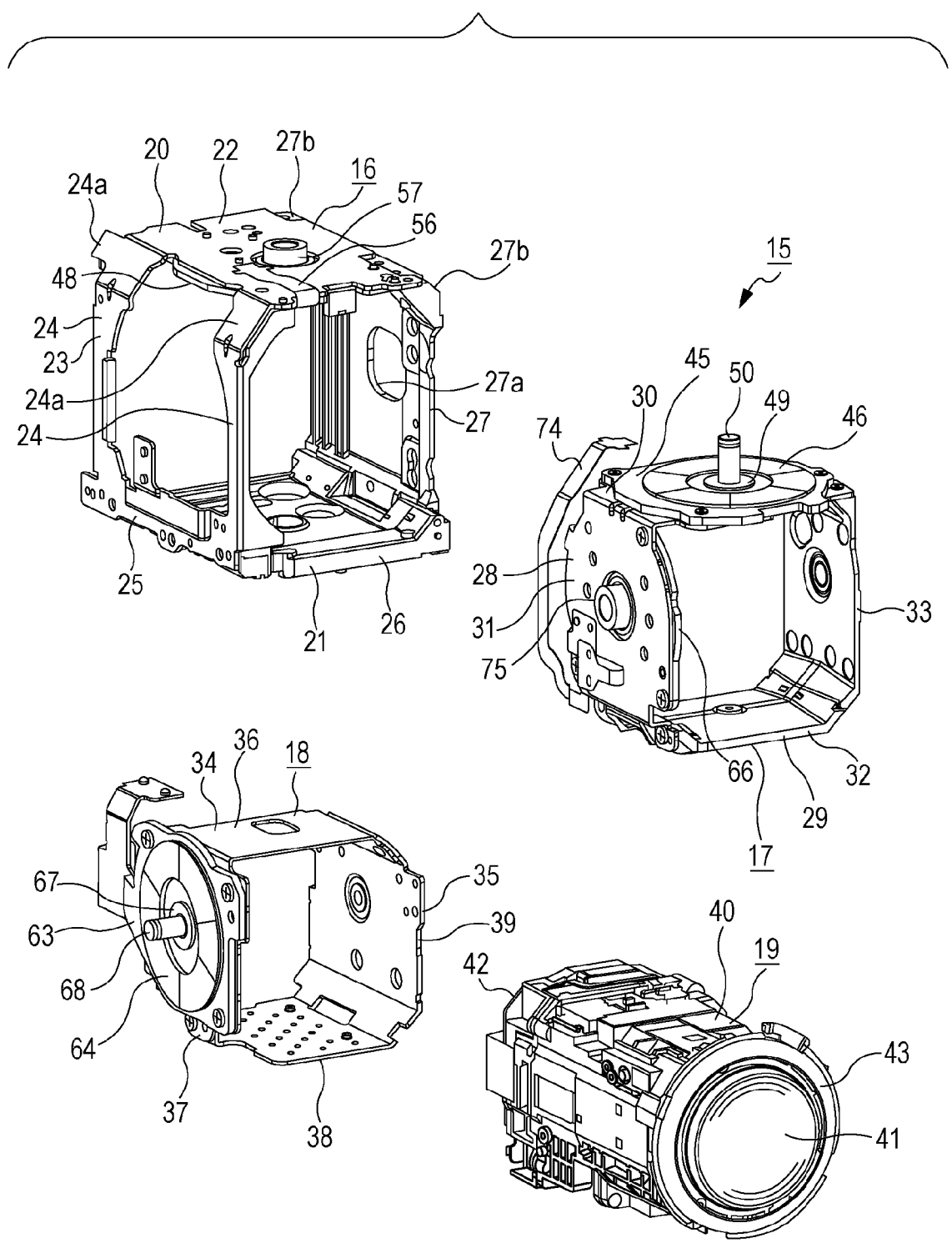
FIG. 7 is a perspective view of the image blur correction device separately illustrating an outer frame, an inner frame, a holding frame and a lens unit.
Figure 8:
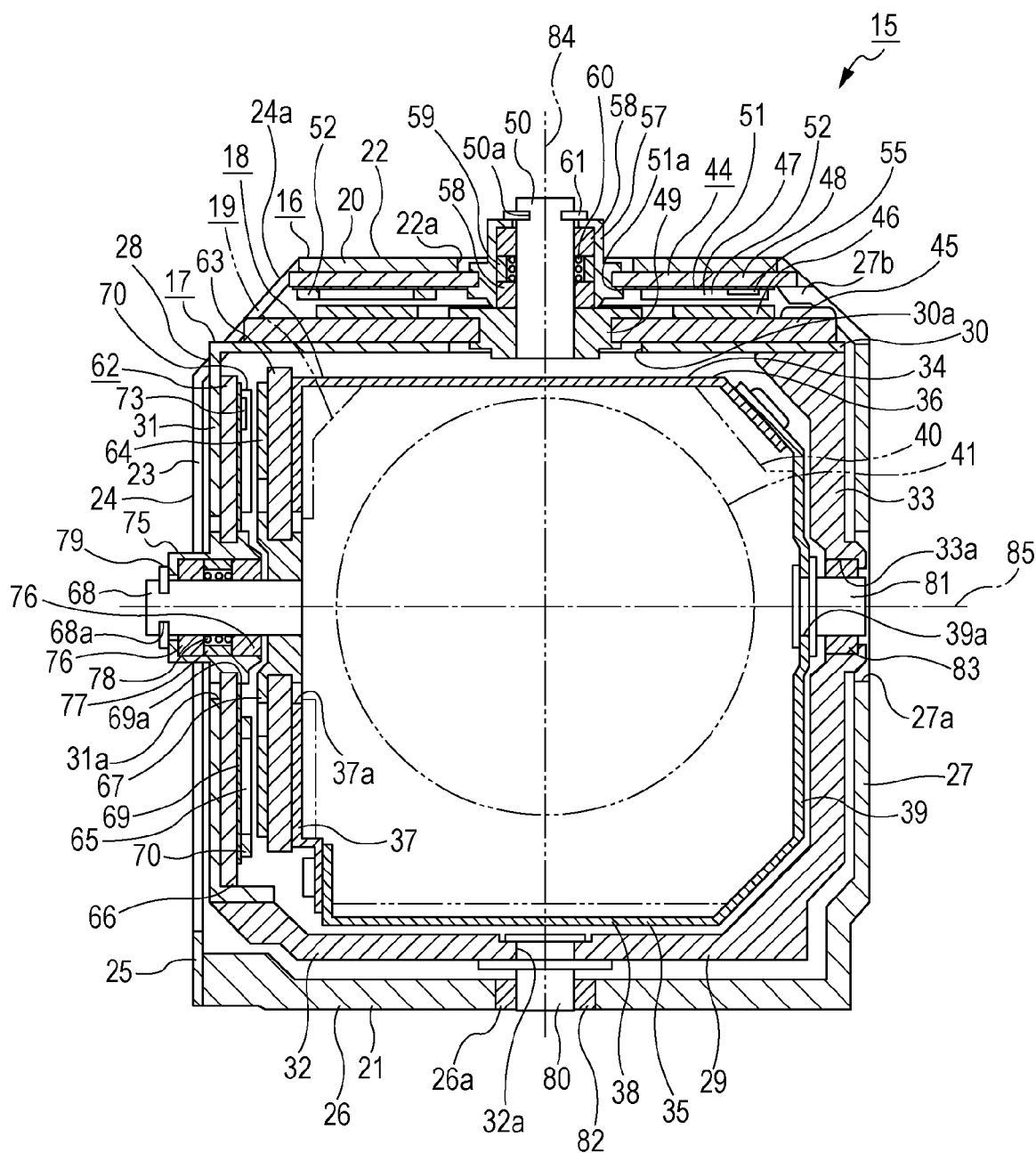
FIG. 8 is a schematically enlarged cross-sectional view of the image blur correction device.

A first driving motor 44 is disposed above the lens unit 19 (refer to FIGS. 4, 6 and 8).

Figure 9:
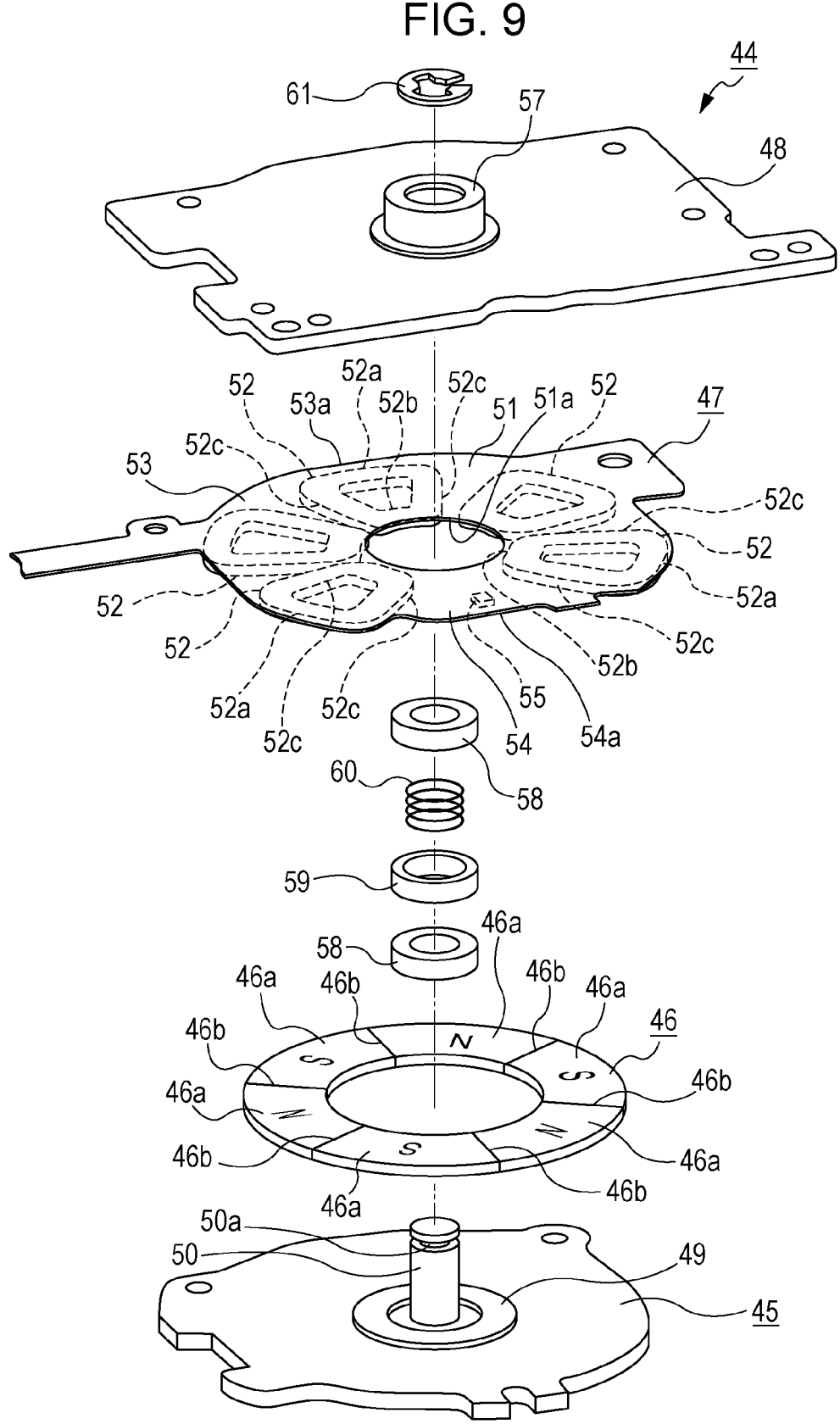
FIG. 9 is an enlarged and exploded perspective view of a first driving motor.
Figure 10:
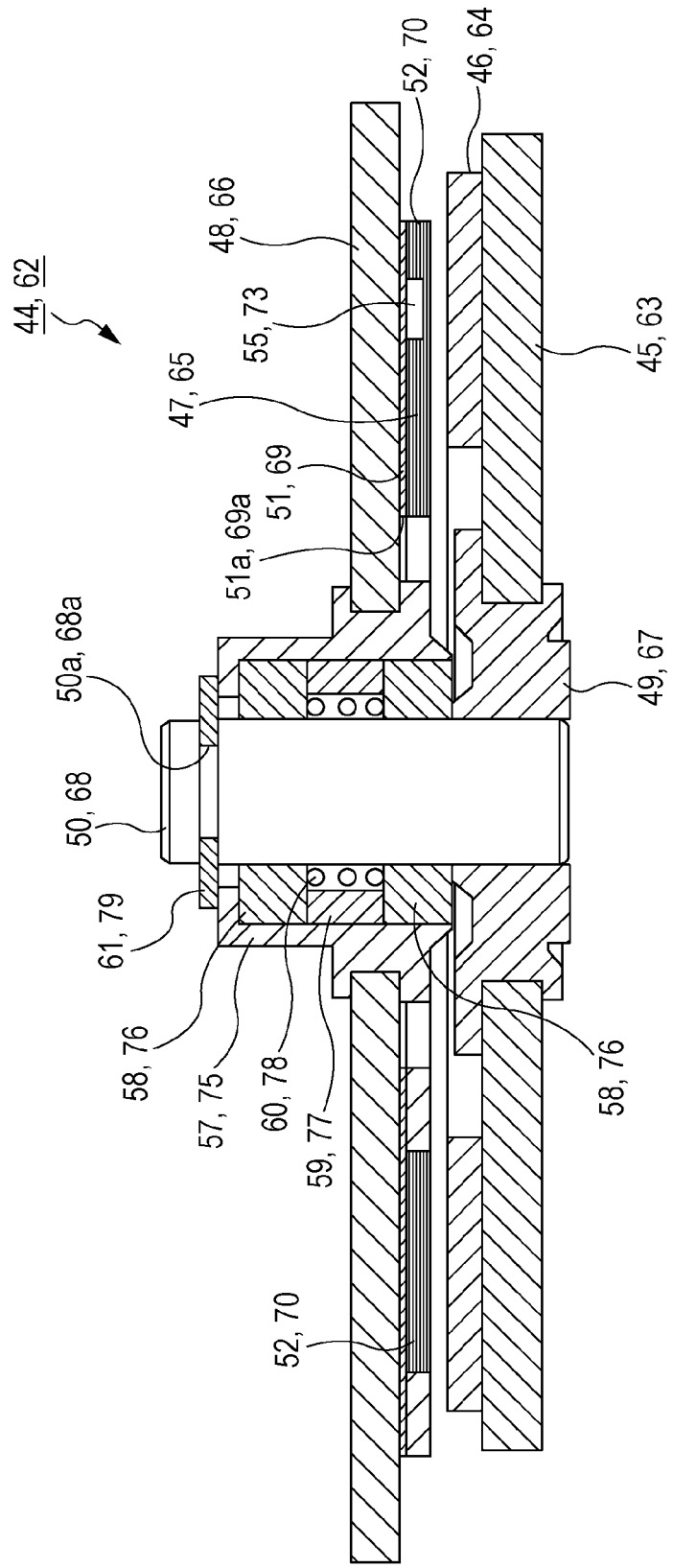
FIG. 10 is an enlarged cross-sectional view of the driving motor.

The first driving motor 44 is, for example, a flat motor, is thin in the vertical direction and has a mounting plate 45, a magnet 46, a coil body 47 and a mounted plate 48 (refer to FIGS. 8 to 10).

The mounting plate 45 faces the vertical direction and an axis fixing member 49 is mounted in the center portion of the mounting plate 45. A lower end portion of an output axis 50 is fixed to the axis fixing member 49 and the output axis 50 protrudes upward from the mounting plate 45 except for the lower end portion. A fitting groove 50a extending in the circumferential direction is formed at a position close to an upper end portion side of the output axis 50. The mounting plate 45 functions as a yoke.

The magnet 46 which is formed in a circular shape is mounted on an upper surface of the mounting plate 45 and magnetic poles of N-poles and S-poles 46a, 46a, ... arranged in the circumferential direction are alternately magnetized. The magnet 46 is magnetized, for example, in 6 poles with regular intervals of 60° and boundaries of the magnetic poles 46a, 46a ... are formed as polar boundaries 46b, 46b ....

The coil body 47 has a thin plate-like base portion 51 which is formed in an annular shape and plural coil portions 52, 52, ... which are separately disposed on a lower surface of the base portion 51 in the circumferential direction and the coil portions 52, 52, ... are sequentially connected and formed in one phase.

An axis insertion hole 51a is formed in the center portion of the base portion 51. A disposition region 53 where the coil portions 52, 52, ... are disposed and a non-disposition region 54 where the coil portions 52, 52, ... are not disposed are formed in the base portion 51. The outer circumference 53a of the disposition region 53 is formed in an approximately arc shape and an outer circumference 54a of the non-disposition region 54 is formed in an approximately linear shape.

The five coil portions 52, 52, ... are respectively provided, for example, with intervals of 60° in the disposition region 53 and are positioned to be separated at even intervals in the circumferential direction. The coil portion 52 is formed with an outer circumferential portion 52a which is formed in a gentle arc shape, an inner circumferential portion 52b which is positioned inside of the outer circumferential portion 52a and formed in a gentle arc shape and thrust generating units 52c and 52c which respectively couple both end portions of the outer circumferential portion 52a and both end portions of the inner circumferential portion 52b.

The center of the axis insertion hole 51a in the base portion 51 matches the first fulcrum axis which causes the lens unit 19 to pivot in the yawing direction and will be described later.

In the non-disposition region 54 of the base portion 51, for example, a Hall element is disposed as a magnetic detection element 55. The magnetic detection element 55 is disposed further inside than the outer circumference of the facing magnet 46 and is present at a position which faces the magnet 46.

A current is supplied from a current driving circuit (not shown) to the coil portions 52, 52, ... and the magnetic detection element 55 of the coil body 47 through a flexible printed wiring plate 56 which is partially mounted on the base portion 51.

The mounted plate 48 faces the vertical direction and an upper surface of the base portion 51 in the coil body 47 is mounted on a lower surface thereof (refer to FIGS. 8 to 10). A holding member 57 which is formed in an approximately cylindrical shape is mounted in the substantially center portion of the mounted plate 48 and the holding member 57 protrudes upward from the mounted plate 48 except for a lower end portion.

Circular first bearings 58 and 58 and a spacer 59 are respectively inserted and held in the holding member 57. For example, the first bearings 58 and 58 are ball bearings (bearings) and are positioned vertically with the spacer 59 being interposed therebetween. A compression coil spring 60 is disposed inside of the spacer 59 and the first bearings 58 and 58 are biased by the compression coil spring 60 in a direction of separating each other in the vertical direction.

In a state in which the first bearings 58 and 58, the spacer 59 and the compression coil spring 60 are inserted and disposed in the holding member 57, the output axis 50 is inserted into the first bearings 58 and 58, the spacer 59 and the axis insertion hole 51a of the base portion 51 from below. The output axis 50 is rotatably supported by the first bearings 58 and 58 which are separately positioned in the axis direction.

An upper end portion of the output axis 50 protrudes upward from the holding member 57 and a fastener 61 is fitted into the fitting groove 50a of the output axis 50 so that the holding member 57 is prevented from coming off from the output axis 50 to configure the first driving motor 44. In a state in which the first driving motor 44 is configured, the coil portions 52, 52, . . . of the coil body 47 and the magnet 46 are disposed to face each other in the vertical direction.

On the right of the lens unit 19, a second driving motor 62 is disposed (refer to FIGS. 4, 6 and 8).

Figure 11:
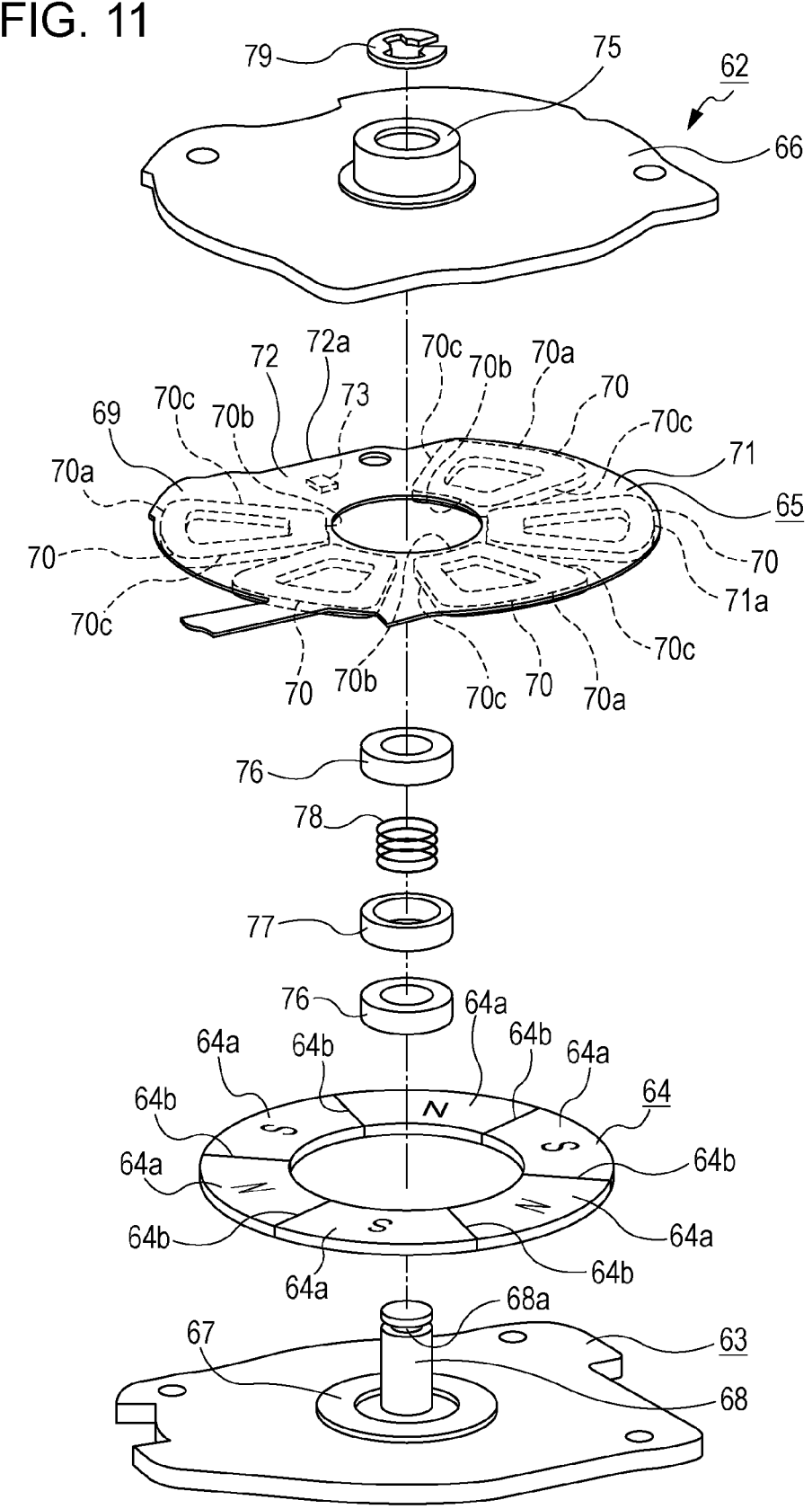
FIG. 11 is an enlarged and exploded perspective view of a second driving motor.

For example, the second driving motor 62 is a flat motor, thin in the horizontal direction, and has a mounting plate 63, a magnet 64, a coil body 65 and a mounted plate 66 (refer to FIGS. 8, 10 and 11).

The mounting plate 63 faces the horizontal direction and an axis fixing member 67 is mounted in the approximately center portion of the mounting plate 63. A left end portion of an output axis 68 is fixed to the axis fixing member 67 and the output axis 68 protrudes to the right from the mounting plate 63 except for the left end portion. A fitting groove 68a extending in the circumferential direction is formed at a position close to the left end portion side of the output axis 68. The mounting plate 63 functions as a yoke.

The magnet 64 which is formed in a circular shape is mounted on a right surface of the mounting plate 63 and magnetic poles of N-poles and S-poles 64a, 64a, . . . arranged in the circumferential direction are alternately magnetized. The magnet 64 is magnetized, for example, in 6 poles with regular intervals of 60° and boundaries of the magnetic poles 64a, 64a . . . are formed as polar boundaries 64b, 64b, . . . .

The coil body 65 has a thin plate-like base portion 69 which is formed in an annular shape and plural coil portions 70, 70, . . . which are separately disposed on a left surface of the base portion 69 in the circumferential direction and the coil portions 70, 70, . . . are sequentially connected and formed in one phase.

An axis insertion hole 69a is formed in the center portion of the base portion 69. A disposition region 71 where the coil portions 70, 70, . . . are disposed and a non-disposition region 72 where the coil portions 70, 70, . . . are not disposed are formed in the base portion 69. The outer circumference 71a of the disposition region 71 is formed in an approximately arc shape and the outer circumference 72a of the non-disposition region 72 is formed in an approximately linear shape.

Five coil portions 70, 70, . . . are respectively provided, for example, with intervals of 60° in the disposition region 71 and are positioned to be separated at even intervals in the circumferential direction. The coil portion 70 is formed with an outer circumferential portion 70a which is formed in a gentle arc shape, an inner circumferential portion 70b which is positioned inside of the outer circumferential portion 70a and formed in a gentle arc shape and thrust generating units 70c and 70c which respectively couple both end portions of the outer circumferential portion 70a and both end portions of the inner circumferential portion 70b.

The center of the axis insertion hole 69a in the base portion 69 matches the second fulcrum axis which causes the lens unit 19 to pivot in the yawing direction and will be described later.

In the non-disposition region 72 of the base portion 69, for example, a Hall element is disposed as a magnetic detection element 73. The magnetic detection element 73 is disposed further inside than the outer circumference of the facing magnet 64 and is present at a position which faces the magnet 64.

A current is supplied from a current driving circuit (not shown) to the coil portions 70, 70, . . . and the magnetic detection element 73 of the coil body 65 through a flexible printed wiring plate 74 which is partially mounted on the base portion 69.

The mounted plate 66 faces the vertical direction and a right surface of the base portion 69 in the coil body 65 is mounted on the left surface thereof (refer to FIGS. 8, 10 and 11). A holding member 75 which is formed in an approximately cylindrical shape is mounted in the substantially center portion of the mounted plate 66 and the holding member 75 protrudes to the right from the mounted plate 66 except for a left end portion.

Circular first bearings 76 and 76 and a spacer 77 are respectively inserted and held in the holding member 75. For example, the first bearings 76 and 76 are ball bearings (bearings) and are positioned on the left and right sides with the spacer 77 being interposed therebetween. A compression coil spring 78 is disposed inside of the spacer 77 and the first bearings 76 and 76 are biased by the compression coil spring 78 in a direction of separating each other in the horizontal direction.

In a state in which the first bearings 76 and 76, the spacer 77 and the compression coil spring 78 are inserted and disposed in the holding member 75, the output axis 68 is inserted into the first bearings 76 and 76, the spacer 77 and the axis insertion hole 69a of the base portion 69 from the left. The output axis 68 is rotatably supported by the first bearings 76 and 76 which are separately positioned in the axis direction.

A right end portion of the output axis 68 protrudes to the right from the holding member 75 and a fastener 79 is fitted into the fitting groove 68a of the output axis 68 so that the holding member 75 is prevented from coming off from the output axis 68 to configure the second driving motor 62. In a state in which the second driving motor 62 is configured, the coil portions 70, 70, . . . of the coil body 65 and the magnet 64 are disposed to face each other in the horizontal direction.

An auxiliary axis 80 is mounted in the mounting hole 32a of the bottom surface portion 32 in the inner frame 17 (refer to FIG. 8). An upper end portion of the auxiliary axis 80 is mounted in the mounting hole 32a and the auxiliary axis 80 protrudes downward from the bottom surface portion 32 except for the upper end portion.

An auxiliary axis 81 is mounted in the mounting hole 39a of the left side surface portion 39 in the holding frame 18. A right end portion of the auxiliary axis 81 is mounted in the mounting hole 39a and the auxiliary axis 81 protrudes to the left from the left side surface portion 39 except for the right end portion.

A second bearing 82 is mounted by being inserted into the disposition hole 26a of the first planar portion 26 in the outer frame 16. As the second bearing 82, for example, a ball bearing (bearing) is used.

A second bearing 83 is mounted by being inserted into the disposition hole 33a of the left surface portion 33 in the inner frame 17. As the second bearing 83, for example, a ball bearing (bearing) is used.

Mounting Structure Among Each Unit

Figure 12:
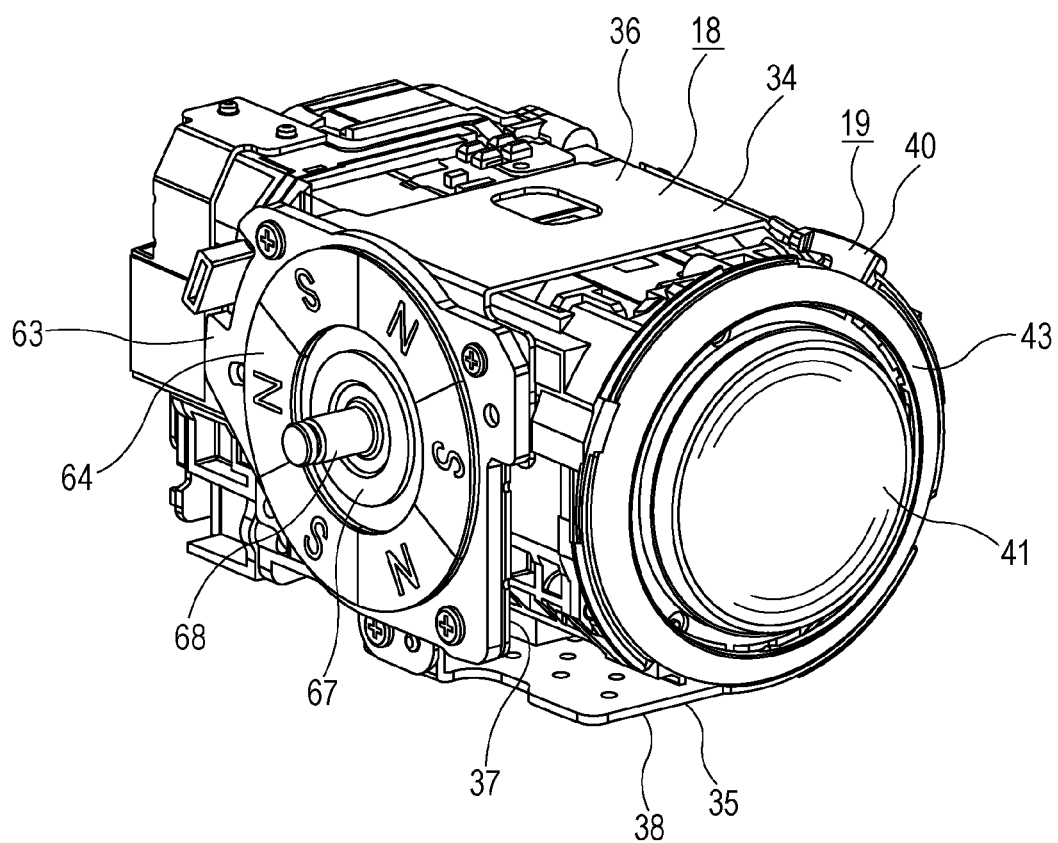
FIG. 12 is a perspective view of the image blur correction device illustrated in a state where an outer frame, an inner frame and a part of the second driving motor mounted on the inner frame are removed.

The holding frame 18 is mounted on the outer circumferential surface of the lens unit 19 by screwing (refer to FIGS. 8 and 12). In a state in which the holding frame 18 is mounted to the lens unit 19, both front and rear end portions of the lens unit 19 respectively protrude to the front and rear of the holding frame 18.

The mounting plate 63 of the second driving motor 62 is mounted on the outer surface of the right side surface portion 37 in the holding frame 18 by screwing and the second driving motor 62 is disposed on the right of the holding frame 18.

Figure 13:
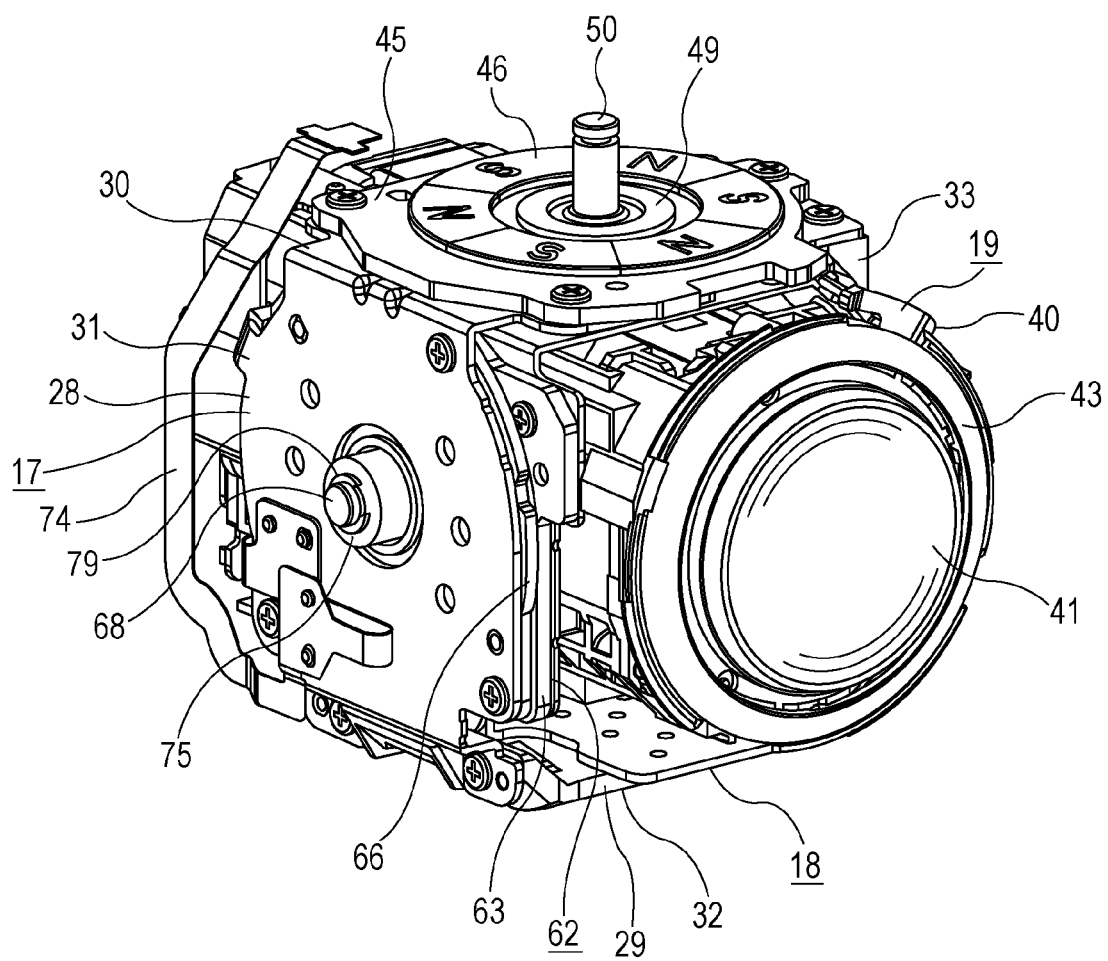
FIG. 13 is a perspective view of the image blur correction device illustrated in a state where an outer frame and a part of the first driving motor mounted on the outer frame are removed.
Figure 14:
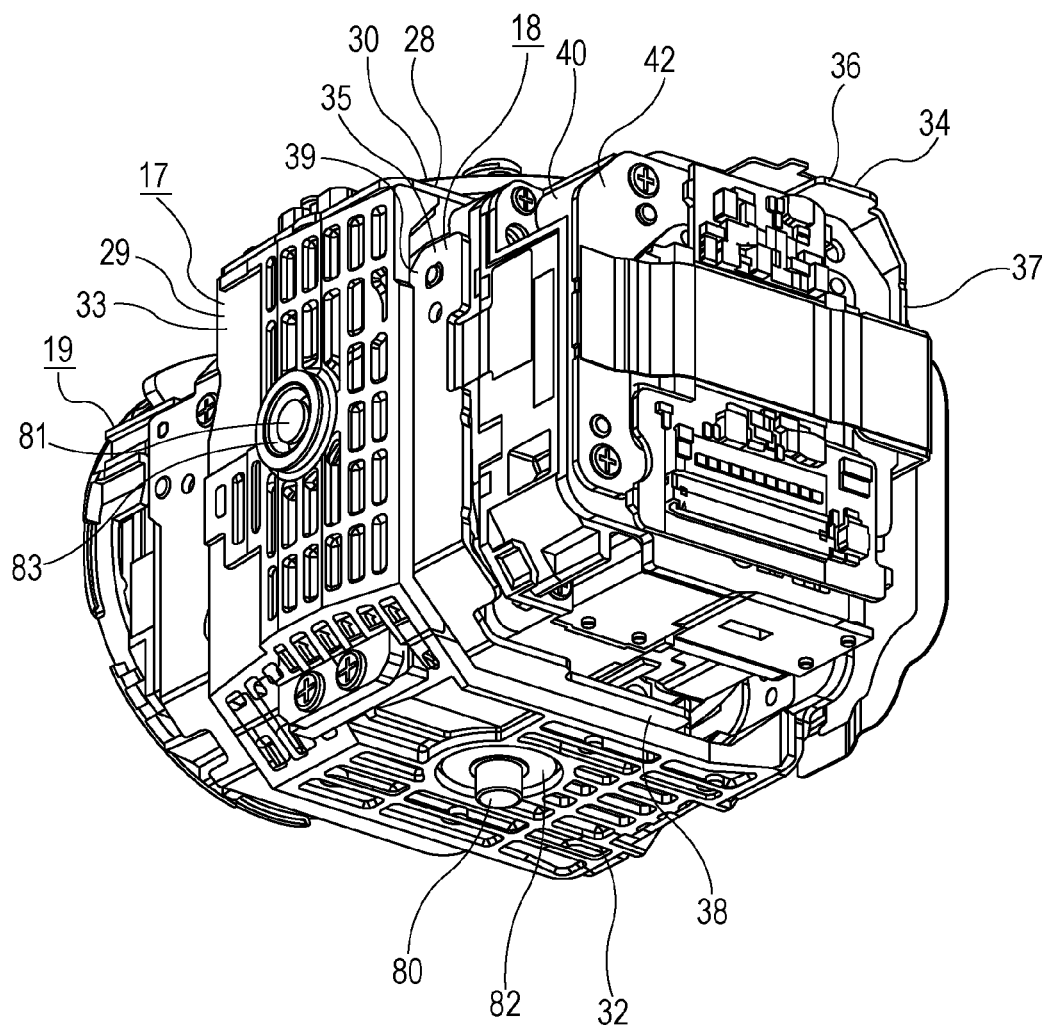
FIG. 14 is a perspective view of the image blur correction device illustrated in a state where the outer frame and a part of the first driving motor mounted on the outer frame are removed and seen from a different direction from FIG. 13.
Figure 15:
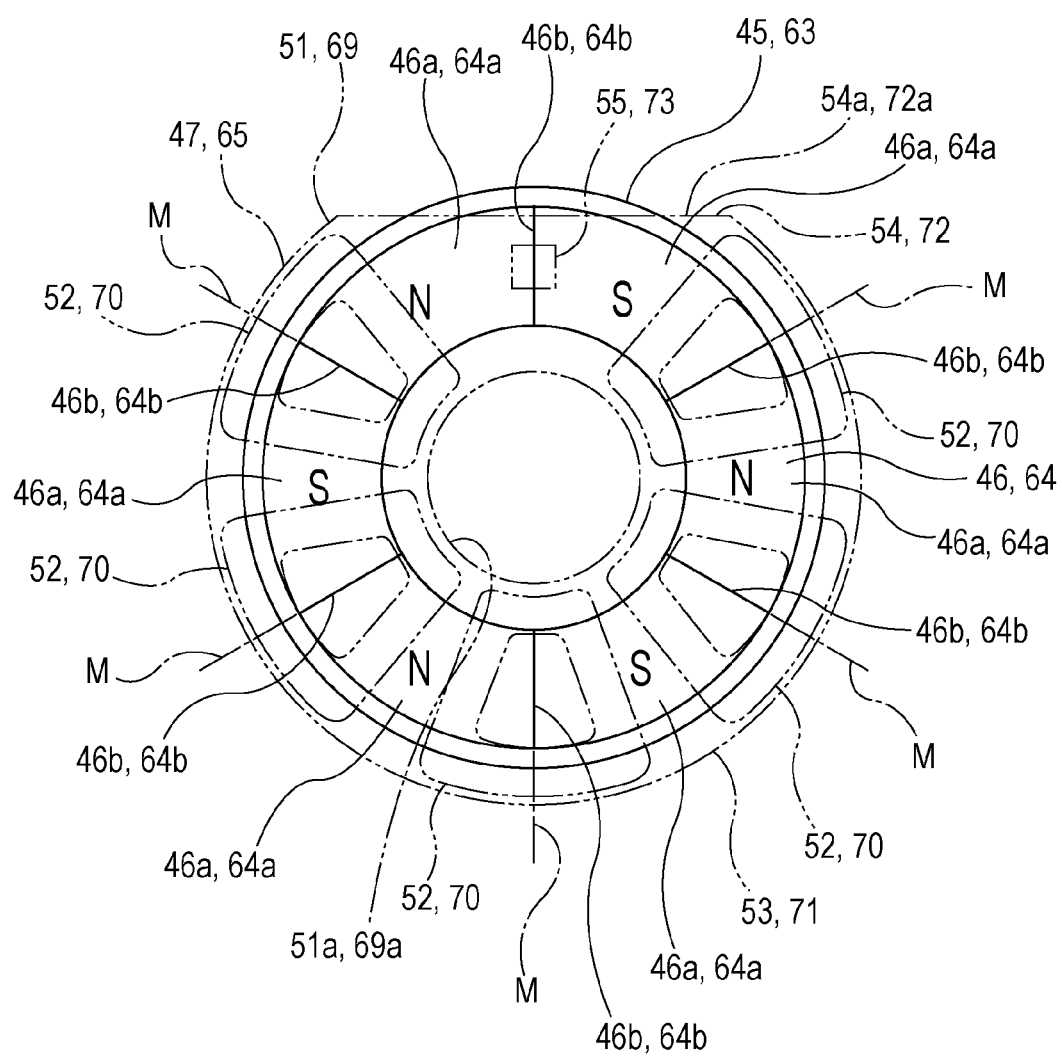
FIG. 15 is a schematic view illustrating a positional relationship between a magnet and a coil body in a reference position.
Figure 16:
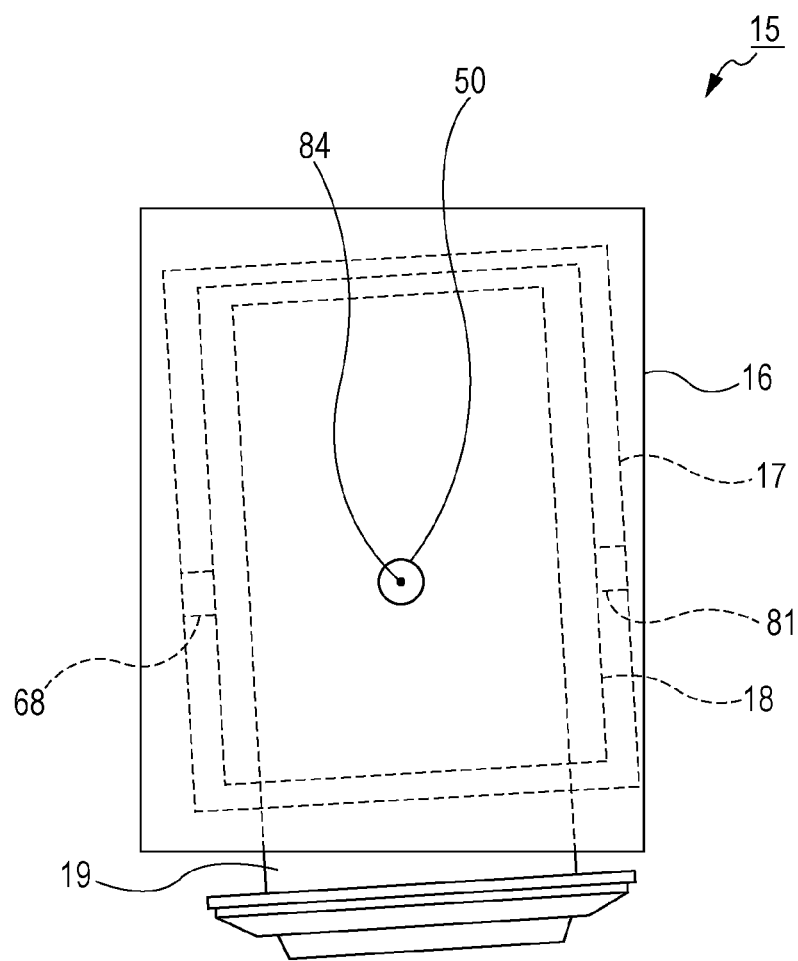
FIG. 16 illustrates a state where the lens unit pivots in a yawing direction together with FIG. 17 and is a schematic plan view illustrating a state of pivoting to one side in the yawing direction.
Figure 17:
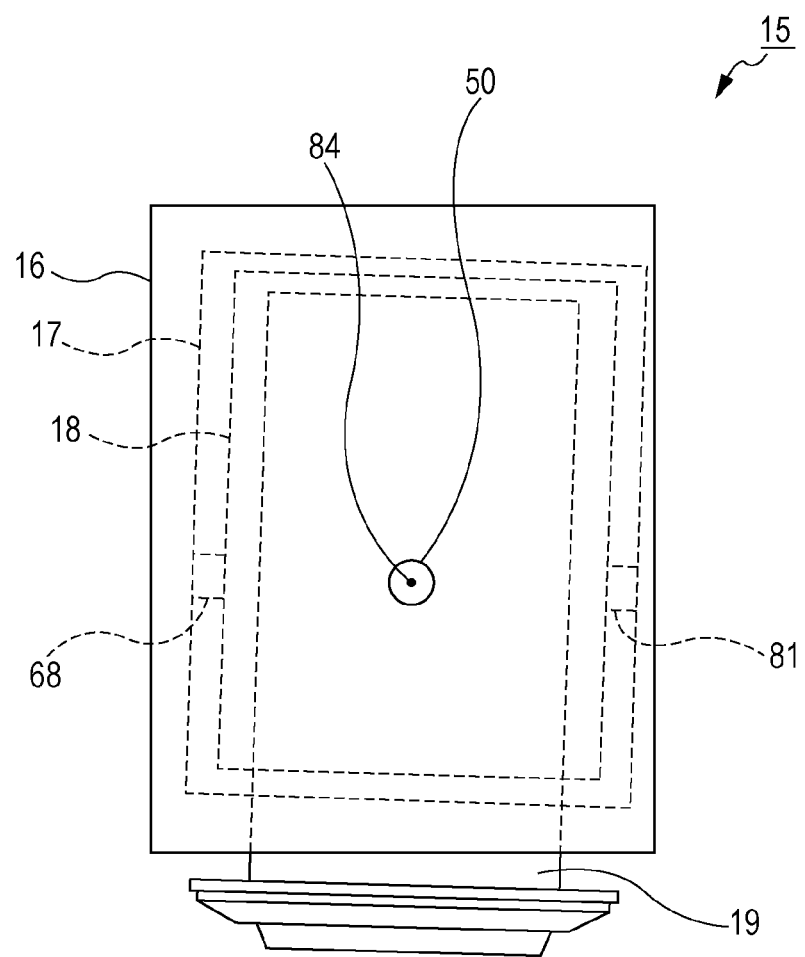
FIG. 17 is a schematic plan view illustrating a state of pivoting to other side in the yawing direction.
Figure 18:
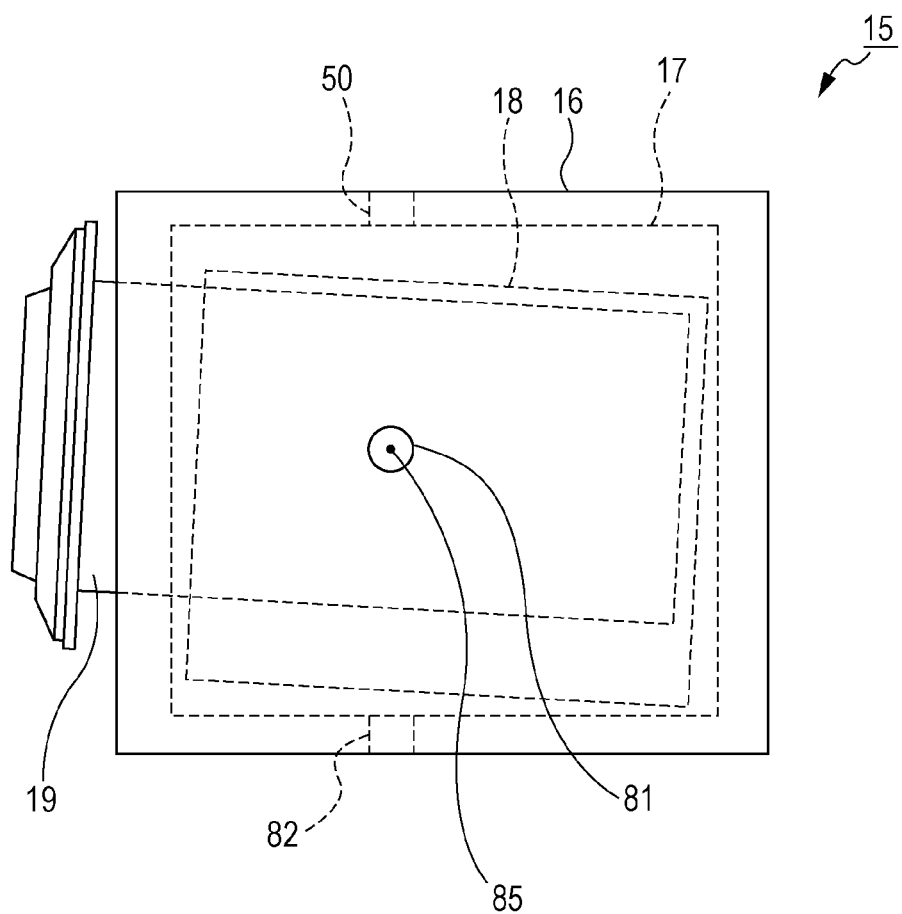
FIG. 18 is illustrates a state where the lens unit pivots in a pitching direction together with FIG. 19 and is a schematic plan view illustrating a state of pivoting to one side in the pitching direction.
Figure 19:
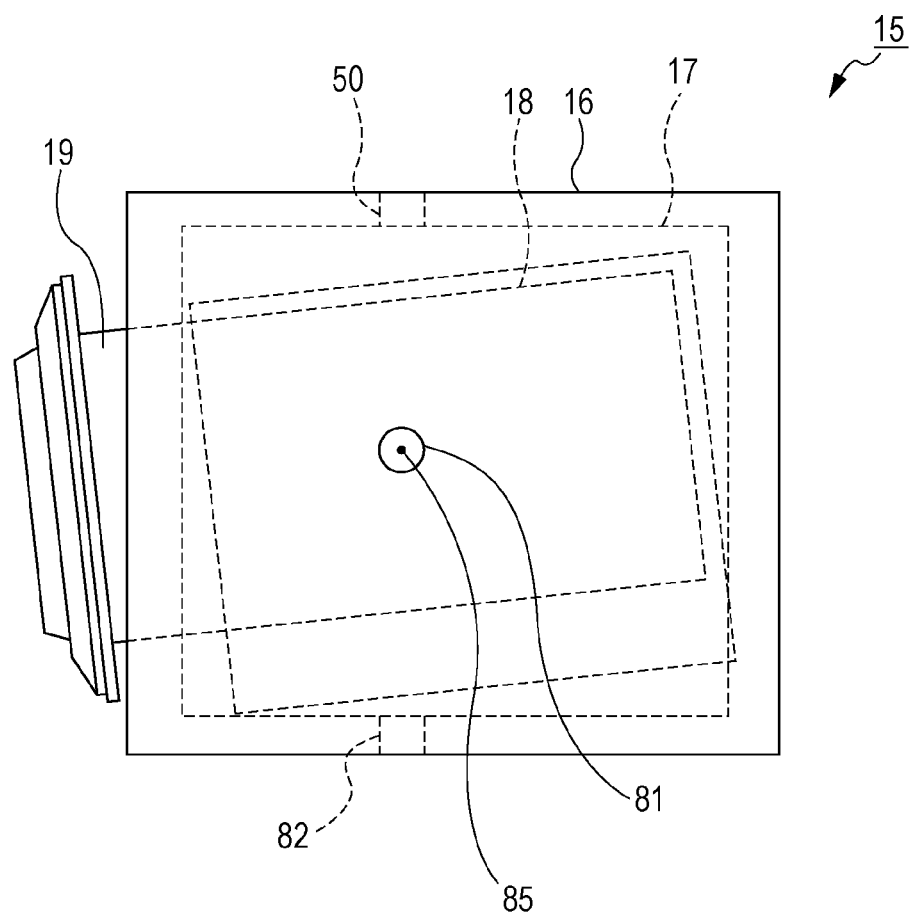
FIG. 19 is a schematic plan view illustrating a state of pivoting to other side in the pitching direction.

The inner frame 17 is disposed on an outer circumferential side of the holding frame 18 (refer to FIGS. 8, 13 and 14). In state in which the inner frame 17 is disposed on the outer circumferential side of the holding frame 18, the auxiliary axis 81 which is mounted in the left side surface portion 39 of the holding frame 18 is rotatably supported by the second bearing 83 which is mounted in the left surface portion 33 of the inner frame 17.

The mounted plate 66 of the second driving motor 62 is mounted on an inner surface of the right surface portion 31 in the inner frame 17 by screwing. At this time, the base portion 69 of the coil body 65 is in a state where the outer circumference 72a of the non-disposition region 72 is positioned at the upper end.

The holding member 75 of the second driving motor 62 is inserted into the insertion hole 31a which is formed on the right surface portion 31 of the inner frame 17 to protrude to the right. At this time, a part of the axis fixing member 67 mounted on the mounting plate 63 is disposed in the insertion disposition hole 37a formed on the right side surface portion 37 of the holding frame 18. Therefore, the amount that the holding member 75 protrudes to the right is reduced so as to facilitate reducing the size of the image blur correction device 15.

An upper surface of the top surface portion 30 in the inner frame 17 is mounted on the mounting plate 45 of the first driving motor 44 by screwing and the first driving motor 44 is disposed above the inner frame 17.

Figure 3:
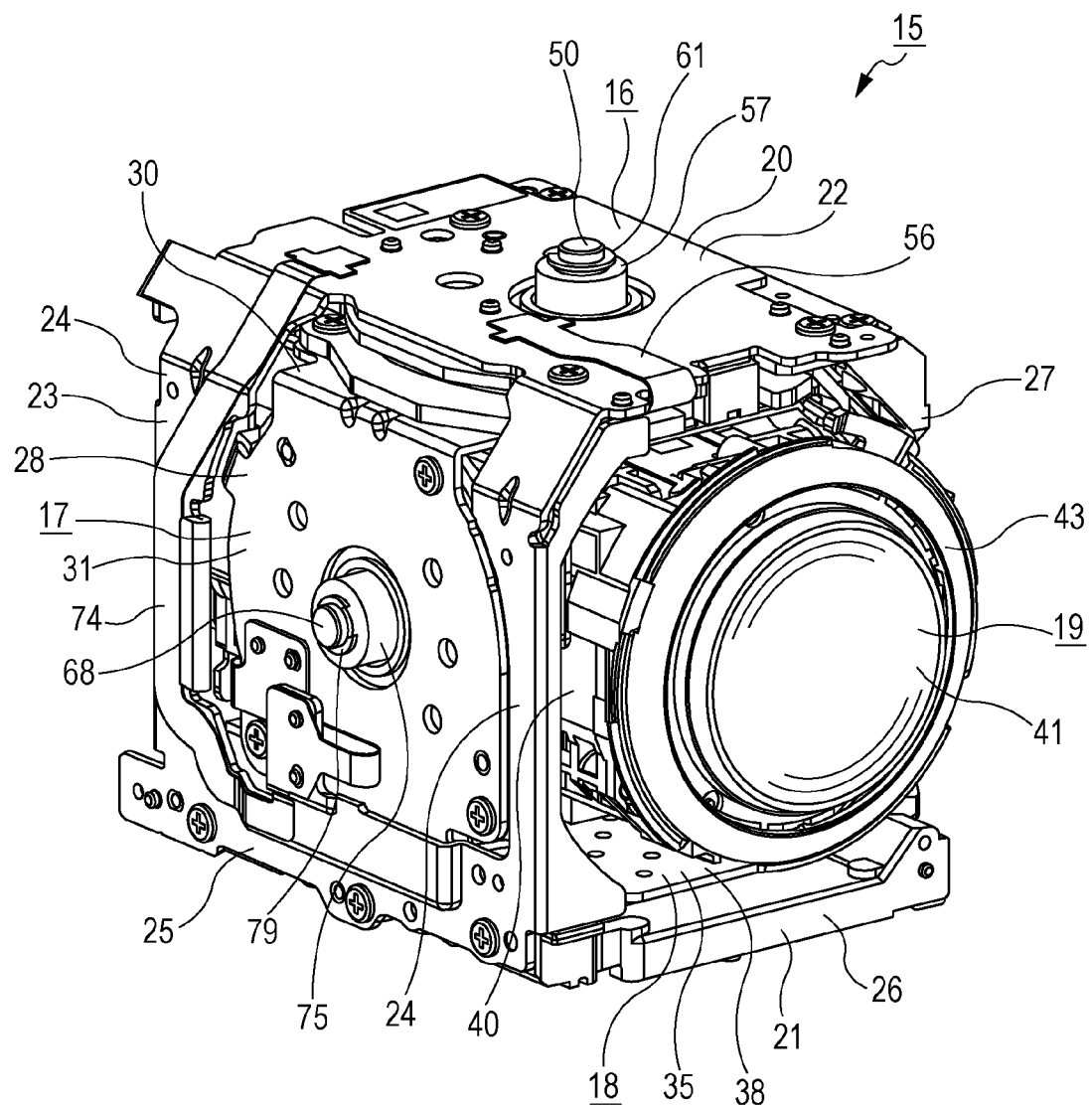
FIG. 3 is a perspective view illustrating an image blur correction device.
Figure 5:
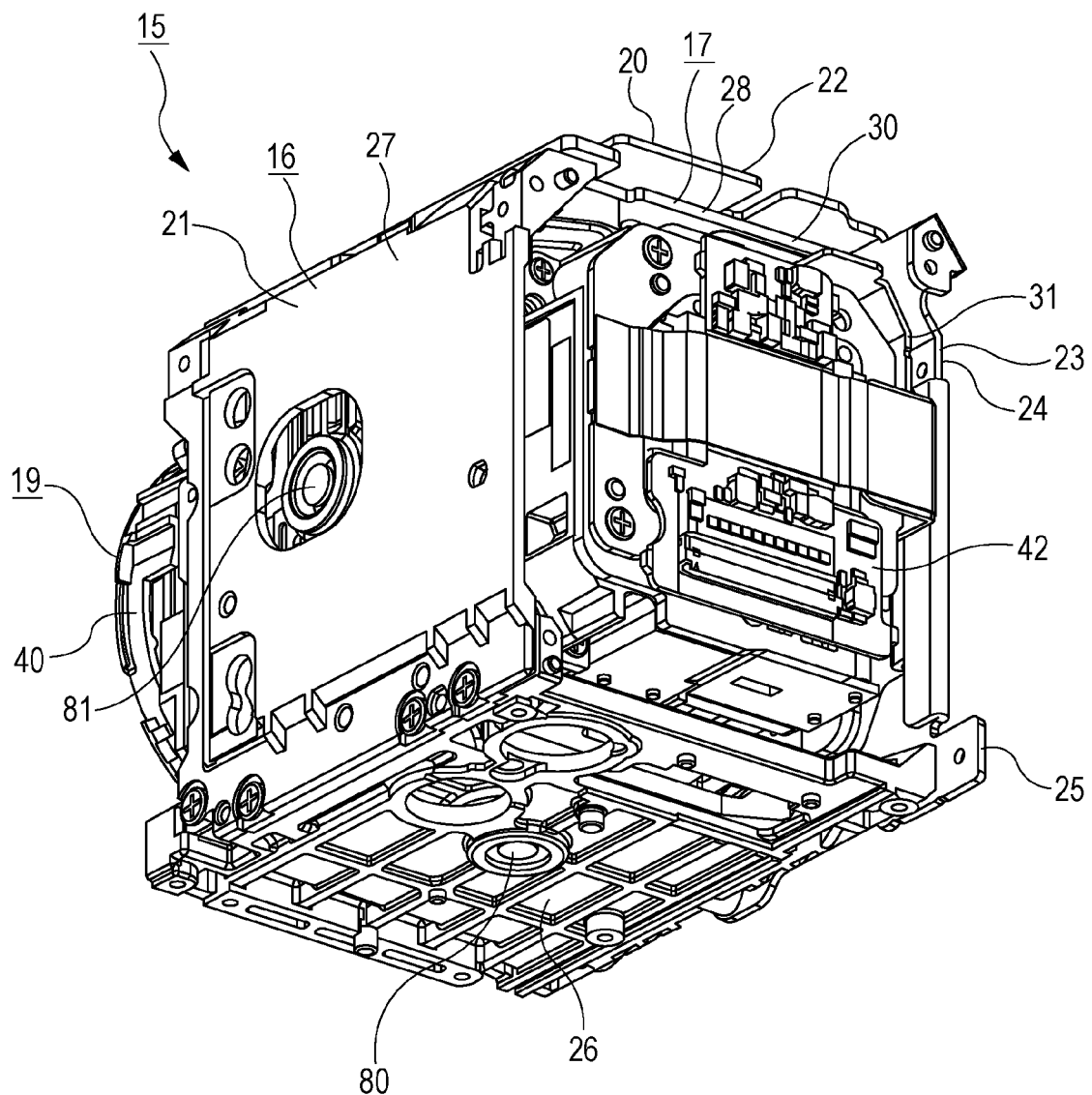
FIG. 5 is a perspective view of the image blur correction device illustrated as seen from a different direction from FIG. 3.

The outer frame 16 is disposed on the outer circumferential side of the inner frame 17 (refer to FIGS. 3, 5 and 8). At this time, a right end portion of the holding member 75 in the second driving motor 62 protrudes to the right from the second surface portion 23 of the outer frame 16.

In a state in which outer frame 16 is disposed on the outer circumferential side of the inner frame 17, the auxiliary axis 80 mounted on the bottom surface portion 32 of the inner frame 17 is rotatably supported by the second bearing 82 mounted on the first planar portion 26 of the outer frame 16.

The mounted plate 48 of the first driving motor 44 is mounted on a lower surface of the first surface portion 22 in the outer frame 16 by screwing. At this time, the base portion 51 of the coil body 47 is in a state in which the outer circumference 54a of the non-disposition region 54 is positioned at the left end.

The mounted plate 48 is mounted on the inclined mounting portions 27b and 27b of the second planar portion 27 in the outer frame 16 by screwing at the left end portion. Therefore, in the outer frame 16, the first surface portion 22 and the second planar portion 27 are joined with the mounted plate 48 of the first driving motor 44 being interposed therebetween.

In this manner, since the first surface portion 22 and the second planar portion 27 are joined with the mounted plate 48 being interposed therebetween in the outer frame 16, it is possible to reduce the size of the first surface portion 22 in the horizontal direction and to form the inclined mounting portions 27b and 27b on the second planar portion 27 as described above.

Therefore, the outer shape of the image blur correction device 15 is reduced as much as the inclined mounting portions 27b and 27b to facilitate reducing the size of the image blur correction device 15.

The holding member 57 of the first driving motor 44 is inserted into the insertion hole 22a formed on the first surface portion 22 of the outer frame 16 to protrude upward. At this time, a part of the axis fixing member 49 mounted on the mounting plate 45 is disposed in the insertion disposition hole 30a formed on the top surface portion 30 of the inner frame 17. Accordingly, the amount that the holding member 57 protrudes upward is reduced so as to facilitate reducing the size of the image blur correction device 15.

In addition, the auxiliary axis 81 is disposed in the insertion disposition hole 27a of the second planar portion 27 in the outer frame 16 and the auxiliary axis 81 does not protrude to the left from the second planar portion 27 so as to further facilitate reducing the size of the image blur correction device 15.

In the image blur correction device 15 with such a configuration, an axis which couples the center axis of the output axis 50 in the first driving motor 44 and the center axis of the auxiliary axis 80 is a first fulcrum axis 84 and an axis which couples the center axis of the output axis 68 in the second driving motor 62 and the center axis of the auxiliary axis 81 is a second fulcrum axis 85 (refer to FIG. 8).

Operation of Image Blur Correction Device

A blur correction operation in the image blur correction device 15 will be described below (refer to FIGS. 15 to 19).

The lens unit 19 is respectively in the yawing direction (first direction) and the pitching direction (second direction) with respect to the first fulcrum axis 84 and the second fulcrum axis 85 as fulcrums.

In a state in which the lens unit 19 is positioned at a reference position which is a position before the lens unit 19 pivots in the yawing direction, that is, in a state in which the lens unit 19 is positioned in the middle of a rotational movement range in the yawing direction, the polar boundaries 46b, 46b . . . of the magnet 46 of the first driving motor 44 respectively match center lines M, M . . . in the circumferential direction of the coil portions 52, 52, . . . (refer to FIG. 15). Moreover, one polar boundary 46b of the magnet 46 at this time matches the center of the magnetic detection element 55 provided in the coil body 47.

On the other hand, in a state in which the lens unit 19 is positioned at a reference position which is a position before the lens unit 19 pivots in the pitching direction, that is, in a state in which the lens unit 19 is positioned in the middle of a rotational movement range in the pitching direction, the polar boundaries 64b, 64b . . . of the magnet 64 of the second driving motor 62 respectively match center lines M, M . . . in the circumferential direction of the coil portions 70, 70, . . . (refer to FIG. 15). Moreover, one polar boundary 64b of the magnet 64 at this time matches the center of the magnetic detection element 73 provided in the coil body 65.

The rotational movement of the lens unit 19 in the yawing direction is performed by supplying a current to the coil portions 52, 52, . . . so that thrust is generated from the thrust generating units 52c and 52c . . . in a direction in which a blur is corrected. At this time, the lens unit 19 pivots around the first fulcrum axis 84 as a fulcrum with the rotation of the mounting plate 45, the magnet 46 and the output axis 50 to be integral with the inner frame 17 and the holding frame 18 with respect to the outer frame 16 (refer to FIGS. 16 and 17).

When the lens unit 19 pivots in the yawing direction, a rotational position of the magnet 46 is detected by the magnetic detection element 55. The detection of the rotational position of the magnet 46 is performed in such a manner that the magnetic detection element 55 detects changes in a magnetic flux with the rotation of the magnet 46 so as to detect the rotational movement position of the lens unit 19 in the yawing direction on the basis of the detection result of the rotational position of the magnet 46. A current is supplied to the coil portions 52, 52, . . . so that thrust is generated from the thrust generating units 52c and 52c . . . in a direction in which a blur is corrected, as described above, on the basis of the detection result of the rotational position of the magnet 46.

Meanwhile, the rotational movement of the lens unit 19 in the pitching direction is performed by supplying a current to the coil portions 70, 70, . . . so that thrust is generated from the thrust generating units 70c and 70c . . . in a direction in which a blur is corrected. At this time, the lens unit 19 pivots around the second fulcrum axis 85 as a fulcrum with the rotation of the mounting plate 63, the magnet 64 and the output axis 68 and the lens unit 19 is integral with the holding frame 18 to pivot with respect to the outer frame 16 and the inner frame 17 (refer to FIGS. 18 and 19).

When the lens unit 19 pivots in the pitching direction, a rotational position of the magnet 64 is detected by the magnetic detection element 73. The detection of the rotational position of the magnet 64 is performed in such a manner that the magnetic detection element 73 detects changes in a magnetic flux with the rotation of the magnet 64 so as to detect the rotational movement position of the lens unit 19 in the pitching direction on the basis of the detection result of the rotational position of the magnet 64. A current is supplied to the coil portions 70, 70, . . . so that thrust is generated from the thrust generating units 70c and 70c . . . in a direction in which a blur is corrected, as described above, on the basis of the detection result of the rotational position of the magnet 64.

In the above description, there is an example in which the lens unit 19 is supported by the inner frame 17 to pivot around the second fulcrum axis 85 as a fulcrum and the lens unit 19 is integral with the inner frame 17 and supported by the outer frame 16 to pivot around the first fulcrum axis 84 as a fulcrum.

However, in the image blur correction device 15, conversely, the lens unit 19 may be supported by the inner frame 17 to pivot around the first fulcrum axis 84 as a fulcrum and the lens unit 19 may be integral with the inner frame 17 and supported by the outer frame 16 to pivot around the second fulcrum axis 85 as a fulcrum.

In order to reduce the load to the output axis and the auxiliary axis, it is desirable that the weight when the lens unit 19 pivots in the pitching direction in which the lens unit 19 is moved in the approximately vertical direction be smaller than the weight when the lens unit 19 pivots in the yawing direction in which the lens unit 19 pivots in the approximately horizontal direction. Therefore, in order to reduce the load to the output axis and the auxiliary axis, it is desirable that the lens unit 19 be supported by the inner frame 17 to pivot around the first fulcrum axis 84 as a fulcrum and the lens unit 19 be integral with the inner frame 17 and supported by the outer frame 16 to pivot around the second fulcrum axis 85 as a fulcrum.

An Embodiment of Imaging Apparatus

Figure 20:
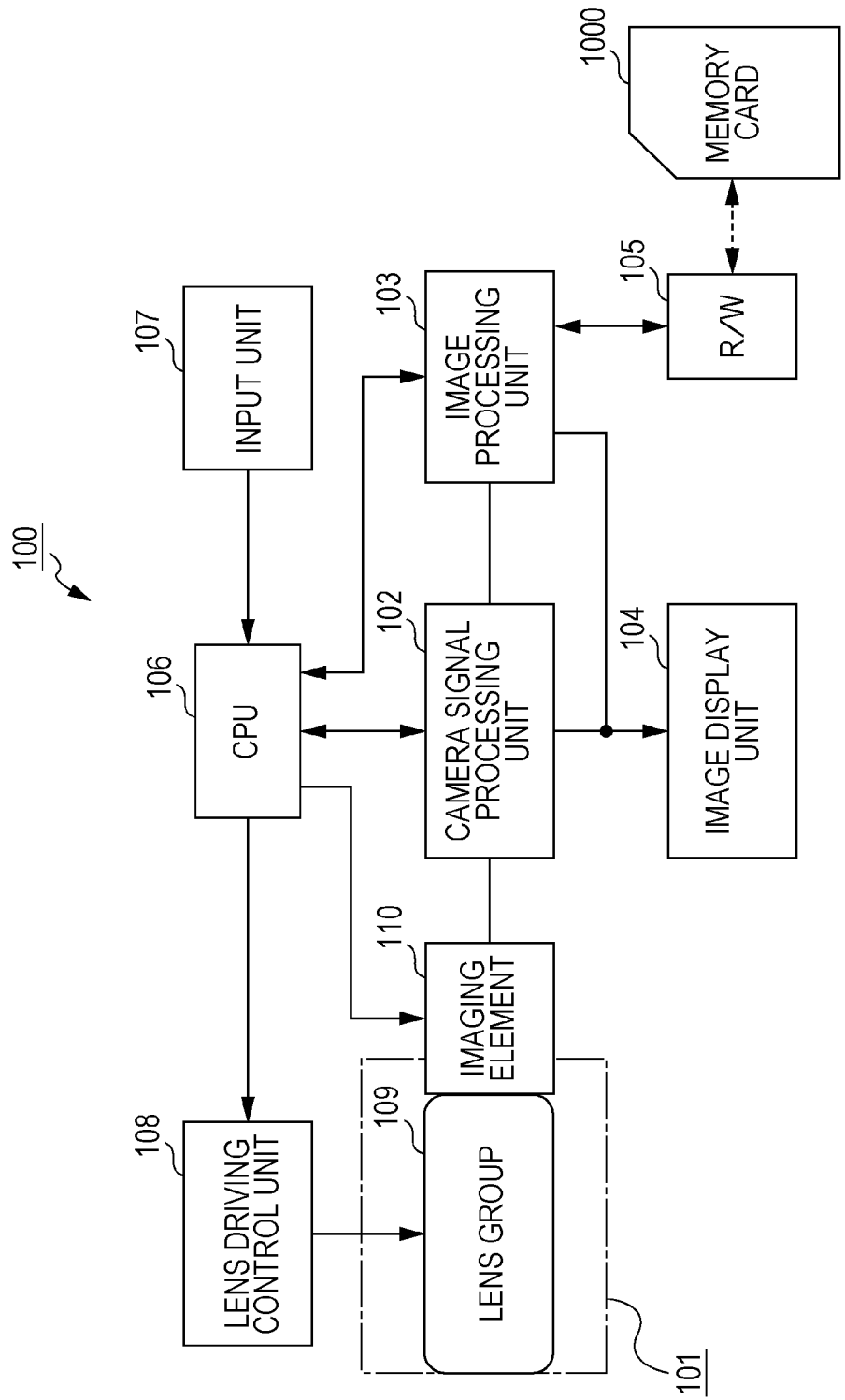
FIG. 20 is a block diagram of an imaging apparatus.

FIG. 20 shows a block diagram of a video camera according to an embodiment of an imaging apparatus of the present technology.

The imaging apparatus (video camera) 100 (corresponding to the imaging apparatus 1) has a lens unit 101 (corresponding to the lens unit 19) having a imaging function, a camera signal processing unit 102 which performs a signal process such as analog-to-digital conversion of an imaged image signal and an image processing unit 103 which performs a record reproducing process of an image signal. In addition, the imaging apparatus 100 includes an image display unit 104 (corresponding to the display unit 13) such as a liquid crystal panel which displays an imaged image, an R/W (reader and writer) 105 which performs writing and reading of an image signal to and from a memory card 1000 (corresponding to the memory card 9) and a CPU (Central Processing Unit) 106 which controls the entire imaging apparatus 100, an input unit 107 (corresponding to the operation switch 7, the operation button 8 and the operation button 10) formed with various switches to perform necessary operation by a user and a lens driving control unit 108 which controls driving of a lens disposed in the lens unit 101.

The lens unit 101 is configured with an optical system including a lens group 109 (corresponding to the lens group provided in the lens unit 19) and an imaging element 110 (corresponding to the imaging element provided in the imaging unit 42) such as a CCD (Charge Coupled Device) and a CMOS (Complementary Metal-Oxide Semiconductor).

The camera signal processing unit 102 performs various signal processes such as a digital signal conversion, a noise removal, image quality correction, and luminance and color difference signal conversion on the output signal from the imaging element 110.

The image processing unit 103 performs a process of a compression coding and a decompression decoding of an image signal on the basis of a predetermined image data format and a conversion process of a data specification such as resolution.

The image display unit 104 has a function of displaying various data such as an operational state with respect to the input unit 107 from a user and an imaged image.

The R/W 105 writes image data coded by the image processing unit 103 to the memory card 1000 and reads the recorded image data from the memory card 1000.

The CPU 106 functions as a control processing unit to control each circuit block provided in the imaging apparatus 100 and controls each circuit block on the basis of instruction input signals from the input unit 107.

The input unit 107 includes, for example, a shutter release button to perform a shutter operation, a selection switch to select an operation mode and the like, and outputs the instruction input signal according to an operation of a user to the CPU 106.

The lens driving control unit 108 controls a motor (not shown) to drive each lens of the lens group 109 on the basis of the control signal from the CPU 106.

The memory card 1000 is, for example, a semiconductor memory which can be detached from a slot connected to the R/W 105.

Hereinafter, operation of the imaging apparatus 100 will be described.

In a photographing standby state, under the control of the CPU 106, an image signal photographed by the lens unit 101 is output to the image display unit 104 through the camera signal processing unit 102 to be displayed as a camera through image. In addition, when an instruction input signal for zooming is input from the input unit 107, the CPU 106 outputs a control signal to the lens driving control unit 108 to move a predetermined lens of the lens group 109 on the basis of the control of the lens driving control unit 108.

When a shutter (not shown) of the lens unit 101 is operated by the instruction input signal from the input unit 107, the photographed image signal is output from the camera signal processing unit 102 to the image processing unit 103 to be subjected to a compression coding process and converted to predetermined data format of digital data. The converted data is output to the R/W 105 to be written to the memory card 1000.

The focusing and zooming are performed, for example, in such a manner that the lens driving control unit 108 moves a predetermined lens of the lens group 109 on the basis of the control signal from the CPU 106.

When the image data recorded on the memory card 1000 is reproduced, predetermined image data is read form the memory card 1000 by the R/W 105 according to the operation of the input unit 107 and a reproduction image signal is output from the image display unit 104 to display a reproduction image after the decompression decoding process is performed by the image processing unit 103.

Conclusion

As described above, in the imaging apparatus 1 and the image blur correction device 15, the output axes 50 and 68 of the first driving motor 44 and the second driving motor 62 are rotatably supported by the pairs of the first bearings 58 and 58 and 76 and 76 respectively separated each other in the axis direction and the auxiliary axes 80 and 81 are rotatably supported by the second bearings 82 and 83.

Accordingly, in the configuration in which the lens unit 19 pivots in the rotation directions of the first fulcrum axis 84 and the second fulcrum axis 85, the positional accuracy of the output axes 50 and 68 and the concentricity of the output axes 50 and 68 and the auxiliary axes 80 and 81 is increased so that it is possible to facilitate improving reliability of the blur correction operation.

Furthermore, in the image blur correction device 15, the lens unit 19 is supported by the inner frame 17 to pivot and the lens unit 19 is integral with the inner frame 17 and supported by the outer frame 16 to pivot.

Therefore, the lens unit 19 can be in both of the yawing direction and the pitching direction with a simple configuration so that it is possible to facilitate simplifying a configuration and a proper blur correction operation.

The left end portion of the mounted plate 48 is mounted on the inclined mounting portions 27b and 27b of the second planar portion 27 in the outer frame 16 by screwing. Therefore, in the outer frame 16, the first surface portion 22 and the second planar portion 27 are joined with the mounted plate 48 of the first driving motor 44 being interposed therebetween.

In this manner, since the first surface portion 22 and the second planar portion 27 are joined with the mounted plate 48 being interposed therebetween in the outer frame 16, it is possible to reduce the size of the first surface portion 22 in the horizontal direction and to form the inclined mounting portions 27b and 27b on the second planar portion 27 as described above.

Accordingly, the outer shape of the image blur correction device 15 is decreased as much as the inclined mounting portions 27b and 27b so as to facilitate reducing the size of the image blur correction device 15.

Moreover, since the rigidity of the first member 20 is different from the rigidity of the second member 21 in the outer frame 16, a member having low rigidity follows a member having high rigidity and deformation unnecessary for the outer frame 16 is not likely to occur so that it is possible to facilitate improving the concentricity of the output axes 50 and 68 and the auxiliary axes 80 and 81.

Furthermore, since the second bearing 83 is disposed in the disposition hole 33a which is formed in the inner frame 17, the size of the image blur correction device 15 is not increased by disposing the second bearing 83 so that it is possible to facilitate improving the positional accuracy of the output axes 50 and 68 and the concentricity of the output axes 50 and 68 and the auxiliary axes 80 and 81 and reducing the size of the image blur correction device 15.

In addition, since the second bearing 82 is disposed in the disposition hole 26a which is formed in the outer frame 16, the size of the image blur correction device 15 is not increased by disposing the second bearing 82 so that it is possible to facilitate improving the positional accuracy of the output axes 50 and 68 and the concentricity of the output axes 50 and 68 and the auxiliary axes 80 and 81 and reducing the size of the image blur correction device 15.

Additionally, since the mounting plate 45 on which the magnet 46 of the first driving motor 44 is mounted is fixed to the inner frame 17, the coil portions 52, 52, . . . do not rotate with respect to the outer frame 16. In the same manner, since the mounting plate 63 on which the magnet 64 of the second driving motor 62 is mounted is fixed to the holding frame 18, the coil portions 70, 70, . . . does not rotate with respect to the inner frame 17.

Accordingly, the flexible printed wiring plates 56 and 74 can be disposed to be fixable and the disposition spaces of the flexible printed wiring plates 56 and 74 are decreased so as to facilitate reducing the size of the image blur correction device 15.

Moreover, it is possible to decrease the size of the inner frame 17 with respect to the outer frame 16 and the size of the holding frame 18 with respect to the inner frame 17 by mounting the magnets 46 and 64 which can be decreased in size of the outer shape with respect to the outer circumferences of the coil portions 52, 52, . . . and 70, 70, . . . to the lens unit 19 side so as to facilitate reducing the size of the image blur correction device 15.

Furthermore, since the coil portions 52, 52, . . . and 70, 70, . . . do not rotate, at the time of the rotational movement of the lens unit 19, it is possible to facilitate an extended service life for the flexible printed wiring plates 56 and 74 without load generation with respect to the flexible printed wiring plates 56 and 74.

Present Technology

The present technology can be configured as below.

(1) An image blur correction device includes a lens unit which has at least one lens and can be in a first direction which is a rotation direction of a first fulcrum axis orthogonal to an optical axis of the lens and in a second direction which is a rotation direction of a second fulcrum axis orthogonal to the optical axis and the first fulcrum axis with respect to an outer casing, a first driving motor which causes the lens unit to pivot in the first direction, and a second driving motor which causes the lens unit to pivot in the second direction, wherein an auxiliary axis is disposed on a side opposite to the first driving motor with the lens unit being interposed therebetween, the lens unit is respectively in the first direction and in the second direction by the rotation of an output axis of the first driving motor and an output axis of the second driving motor, and each output axis is respectively rotatably supported by a pair of first bearings separated in an axis direction and each auxiliary axis is respectively rotatably supported by a second bearing.

(2) The image blur correction device according to (1), further includes an inner frame which is positioned outside of the lens unit, and an outer frame which is positioned outside of the inner frame, wherein the lens unit is supported by the inner frame to pivot around one of the first fulcrum axis and the second fulcrum axis as a fulcrum, and the lens unit is integral with the inner frame and supported by the outer frame to pivot around the other of the first fulcrum axis and the second fulcrum axis as a fulcrum.

(3) The image blur correction device according to (2), wherein a first member having a first surface portion and a second surface portion of which respective one end portions are connected in an orthogonal state and a second member having a first planar portion and a second planar portion of which the respective one end portions are connected in an orthogonal state are provided in the outer frame, and in a state in which the first surface portion and the first planar portion face each other and the second surface portion and the second planar portion face each other, the other end portion of the second surface portion and the other end portion of the first planar portion are joined and the other end portion of the first surface portion and the other end portion of the second planar portion are joined with a part of the first driving motor or the second driving motor being interposed therebetween.

(4) The image blur correction device according to (3), wherein the rigidity of the first member is different from the rigidity of the second member.

(5) The image blur correction device according to any of (1) to (4), wherein a disposition hole is formed in the inner frame, and the second bearing is disposed in the disposition hole.

(6) The image blur correction device according to any of (1) to (5), wherein a disposition hole is formed in the outer frame, and the second bearing is disposed in the disposition hole.

(7) The image blur correction device according to any of (1) to (6), wherein a mounting plate on which the magnet is mounted and a base portion to which a coil portion is mounted are provided in the driving motor, and the mounting plate is mounted to the lens unit.

(8) An imaging apparatus includes an image blur correction device which has a lens unit having at least one lens and an outer casing in which the lens unit is disposed and in which the lens unit pivots in a first direction which is a rotation direction of a first fulcrum axis orthogonal to an optical axis of the lens and in a second direction which is a rotation direction of a second fulcrum axis orthogonal to the optical axis and the first fulcrum axis with respect to the outer casing to correct a blur of an image, wherein the image blur correction device includes a first driving motor which causes the lens unit to pivot in the first direction and a second driving motor which causes the lens unit to pivot in the second direction, and wherein an auxiliary axis is disposed on a side opposite to the first driving motor with the lens unit being interposed therebetween, the lens unit is respectively in the first direction and in the second direction by the rotation of an output axis of the first driving motor and an output axis of the second driving motor, and each output axis is respectively rotatably supported by a pair of first bearings separated in an axis direction and each auxiliary axis is respectively rotatably supported by a second bearing.

The specific shapes and structures of each unit shown in the above-described embodiments are merely examples of an embodiment when the present technology is realized and the technical scope of the present technology should not be interpreted as limited thereto.

The present disclosure contains subject matter related to that disclosed in Japanese Priority Patent Application JP 2012-000758 filed in the Japan Patent Office on Jan. 5, 2012, the entire contents of which are hereby incorporated by reference.

What is claimed is:

1. An image blur correction device, comprising:
a lens unit which has at least one lens which pivots in a first direction around a first fulcrum axis, orthogonal to an optical axis of the lens and which pivots in a second direction around a second fulcrum axis, orthogonal to the optical axis and the first fulcrum axis;
a first driving motor which causes the lens unit to pivot in the first direction; and
a second driving motor which causes the lens unit to pivot in the second direction,
wherein an auxiliary axis is positioned on a side opposite to the first driving motor with the lens unit being positioned between the auxiliary axis and the first driving motor;
wherein the lens unit is positioned in the first direction and positioned in the second direction around an output axis of the first driving motor and around an output axis of the second driving motor; and
wherein each output axis is supported by a pair of first bearings separated in an axis direction and the auxiliary axis is supported by a second bearing; and
an inner frame which is positioned outside of the lens unit, including:
a first member having a first surface portion and a second surface portion which are connected, in an orthogonal state and a second member having a first planar portion and a second planar portion which are connected, in an orthogonal state; and
the first surface portion and the first planar portion face each other and the second surface portion and the second planar portion face each other and the second surface portion and the first planar portion are connected and the first surface portion and the second planar portion are connected; and
wherein rigidity is different between the first member and the second member.

2. The image blur correction device according to claim 1, further comprising:
an outer frame which is positioned outside of the inner frame;
wherein the lens unit is supported by the inner frame to pivot around the first fulcrum axis and around the second fulcrum axis as a fulcrum; and
the lens unit is positioned within the inner frame and supported by the outer frame to pivot around the first fulcrum axis and the second fulcrum axis as a fulcrum.

3. The image blur correction device, according to claim 1, wherein
a disposition hole is formed in the inner frame; and
the second bearing is positioned in a disposition hole.

4. The image blur correction device, according to claim 1, wherein
a disposition hole is formed in the outer frame; and
the second bearing is positioned in a disposition hole.

5. The image blur correction device according to claim 1, wherein
a mounting plate on which a magnet is positioned and a base portion to which a coil portion is positioned are provided in the first driving motor and the second driving motor.

6. An imaging apparatus, comprising:
an image blur correction device, including a lens unit having at least one lens and an outer casing in which the lens unit is positioned;
wherein the lens unit pivots in a first direction around a first fulcrum axis, optical axis of the lens and which pivots in a second direction around a second fulcrum axis, orthogonal to the optical axis and the first fulcrum axis;
wherein the image blur correction device, includes:
a first driving motor which causes the lens unit to pivot in the first direction, and
a second driving motor which causes the lens unit to pivot in the second direction, and
wherein an auxiliary axis is positioned on a side opposite to the first driving motor with the lens unit being positioned between the auxiliary axis and the first driving motor;
wherein the lens unit is positioned in the first direction and positioned in the second direction by the rotation of an output axis of the first driving motor and an output axis of the second driving motor; and wherein each output axis is supported by a pair of first bearings separated in an axis direction and the auxiliary axis is supported by a second bearing; and an inner frame which is positioned outside of the lens unit, including:

a first member having a first surface portion and a second surface portion which are connected, in an orthogonal state and a second member having a first planar portion and a second planar portion which are connected, in an orthogonal state; and the first surface portion and the first planar portion face each other and the second surface portion and the second planar portion face each other and the second surface portion and the first planar portion are connected and the first surface portion and the second planar portion are connected; and wherein rigidity is different between the first member and the second member.

7. The imaging apparatus according to claim 6, further comprising:

an outer frame which is positioned outside of the inner frame;

wherein the lens unit is supported by the inner frame to pivot around the first fulcrum axis and around the second fulcrum axis as a fulcrum; and the lens unit is positioned within the inner frame and supported by the outer frame to pivot around the other of the first fulcrum axis and the second fulcrum axis as a fulcrum.

8. The imaging apparatus according to claim 6, wherein a disposition hole is formed in the inner frame; and the second bearing is positioned in a disposition hole.

9. The imaging apparatus according to claim 6, wherein a disposition hole is formed in the outer frame; and the second bearing is positioned in a disposition hole.

10. The imaging apparatus according to claim 6, wherein a mounting plate on which a magnet is positioned and a base portion to which a coil portion is positioned are provided in the first driving motor and the second driving motor.

* * * * *